United States Patent [19]
Morikubo et al.

[11] Patent Number: 5,423,907
[45] Date of Patent: Jun. 13, 1995

[54] ETHANOL-BASED INK FOR MARKING PENS

[75] Inventors: Satoshi Morikubo, Fujioka; Kiyohiko Kobayashi, Maebashi; Nobuo Suzuki, Saitama; Yoshikazu Hattori, Kazo, all of Japan

[73] Assignee: Mitsubishi Pencil Kabushiki Kaibha, Tokyo, Japan

[21] Appl. No.: 199,199

[22] PCT Filed: Jun. 18, 1993

[86] PCT No.: PCT/JP93/00019
   § 371 Date: Feb. 22, 1994
   § 102(e) Date: Feb. 22, 1994

[87] PCT Pub. No.: WO94/00522
   PCT Pub. Date: Jan. 6, 1994

[30] Foreign Application Priority Data

| Jun. 19, 1992 | [JP] | Japan | 4-184621 |
| Jun. 19, 1992 | [JP] | Japan | 4-184622 |
| Jun. 19, 1992 | [JP] | Japan | 4-184623 |
| Jun. 19, 1992 | [JP] | Japan | 4-184624 |
| Jun. 19, 1992 | [JP] | Japan | 4-184625 |
| Jun. 19, 1992 | [JP] | Japan | 4-184626 |
| Jun. 19, 1992 | [JP] | Japan | 4-184627 |
| May 27, 1993 | [JP] | Japan | 5-125884 |
| May 28, 1993 | [JP] | Japan | 5-127390 |
| Jun. 1, 1993 | [JP] | Japan | 5-130439 |

[51] Int. Cl.⁶ .................................. C09D 11/02
[52] U.S. Cl. .................................. 106/22 K
[58] Field of Search ............... 106/22 K, 22 R, 22 D, 106/22 H

[56] References Cited

U.S. PATENT DOCUMENTS

| 3,961,965 | 8/1976 | Zwahlen | 106/20 R |
| 4,304,601 | 12/1981 | Sharp | 106/29 R |
| 4,525,216 | 6/1985 | Nakanishi | 106/30 R |
| 4,557,618 | 12/1985 | Iwata et al. | 106/20 R |
| 4,578,117 | 3/1986 | Nakanishi | 106/20 R |
| 4,604,139 | 8/1986 | Shioi et al. | 106/22 R |
| 4,605,441 | 8/1986 | Masuda et al. | 106/30 R |
| 4,623,392 | 11/1986 | Ou-Yang | 106/30 R |
| 4,666,519 | 5/1987 | Akiyama et al. | 106/20 R |
| 4,822,417 | 4/1989 | Kobayashi et al. | 106/30 R |
| 5,279,653 | 1/1994 | Kobayashi et al. | 106/22 R |

FOREIGN PATENT DOCUMENTS

| 63-77982 | 4/1988 | Japan |
| 63-137977 | 6/1988 | Japan |
| 3-250073 | 11/1991 | Japan |
| 4-76073 | 3/1992 | Japan |

*Primary Examiner*—Helene Klemanski
*Attorney, Agent, or Firm*—Darby & Darby

[57] ABSTRACT

The present invention provides an ethanol-based ink for marking pens which comprises at least one dye selected from the group consisting of compounds represented by specific structures, an ethanol-soluble resin, and ethanol.

According to the present invention, yellow, orange, red, blue, pink, sky-blue and black inks can be provided, and even if these inks are allowed to stand for a long period of time, any precipitates are not observed in the inks and so they are excellent in water resistance after writing. In addition, the fixing properties of the inks to a metal are also good.

13 Claims, No Drawings

ETHANOL-BASED INK FOR MARKING PENS

TECHNICAL FIELD

The present invention relates to an ink for use in marking pens, and more specifically, it relates to an ink for marking pens in which ethanol is used as a main solvent.

BACKGROUND ART

In inks for oily marking pens, there have been used solvents such as xylene, methyl cellosolve and the like which have a good solubility to oil-soluble dyes, but these solvents are odorous and poisonous and so they are devoid of safety to human beings. For this reason, the usage, use circumstances and the like of these solvents are required to be restricted and limited.

In order to solve these problems, there has been developed, in recent years, an alcoholic ink mainly comprising a less odorous and less poisonous alcoholic solvent, particularly an ink for marking pens (hereinafter referred to as "ethanol-based ink") in which ethanol is used as a main solvent.

However, in this kind of ethanol-based ink, a dye is insoluble, and even if soluble, the dye precipitates during a long period of time, which means that the ink is poor in stability with time, because among organic solvents, ethanol has a relatively low solubility to the dye and a resin, and the oil-soluble dye which has been heretofore used in the marking pens contains a few functional groups having an interaction with ethanol. Hence, a dye is now desired which is compatible with ethanol and an ethanol-soluble resin for use in the ink.

DISCLOSURE OF THE INVENTION

The present invention intends to overcome the abovementioned drawbacks of an ink for marking pens containing ethanol as a main solvent, and an object of the present invention is to provide an ethanol-based ink for marking pens which inhibits a dye from precipitating and which is excellent in stability with time and water resistance.

The present inventors have intensively conducted research to solve the above-mentioned problems, and as a result, they have succeeded in finding a dye having a specific structure which is excellent in compatibility with ethanol and an ethanol-soluble resin. In consequence, an ethanol-based ink for marking pens of the present invention has now been completed.

That is, an ethanol-based ink for marking pens of the present invention is characterized by comprising at least one dye selected from the group consisting of dyes represented by the following formulae (I) to (IX) and a dye of Color Index No. Solvent Black 7, an ethanol-soluble resin, and ethanol:

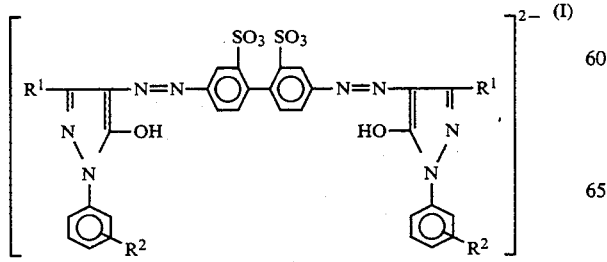
(I)

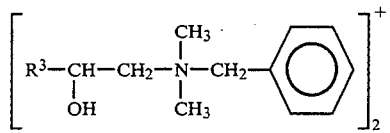

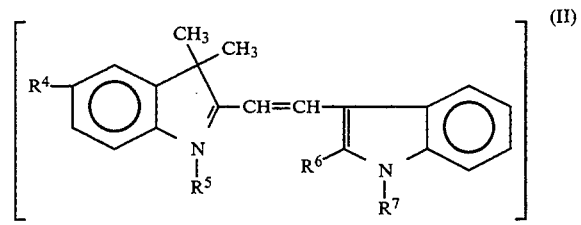
(II)

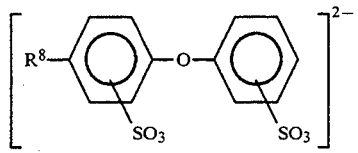

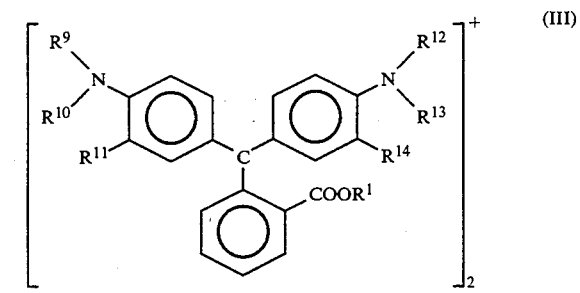
(III)

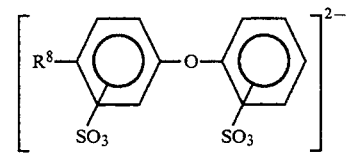

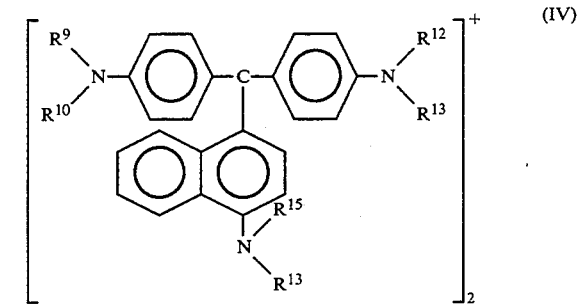
(IV)

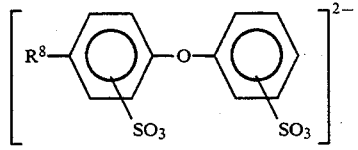

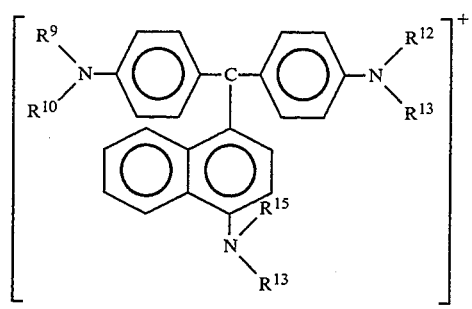
(V)

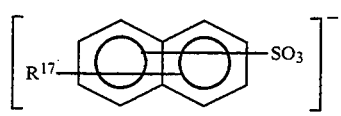

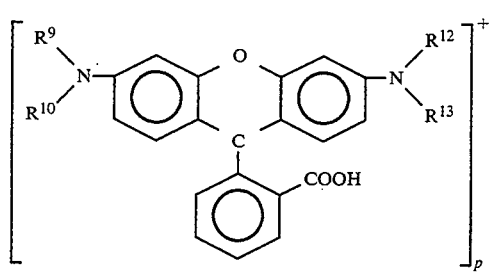
(VI)

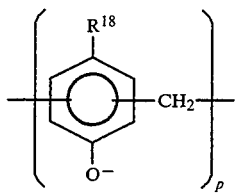

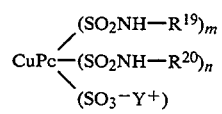
(VII)

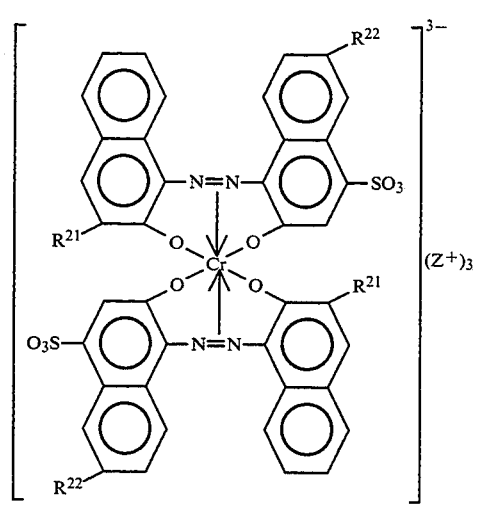
(VIII)

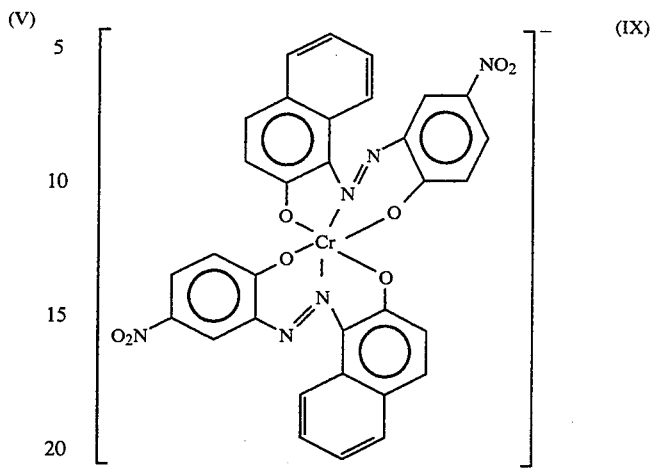
(IX)

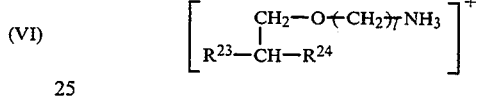

(wherein $R^1$ is —$CH_3$ or —$C_2H_5$, $R^2$ is —H, —$CH_3$, —Cl or —$SO_2NH_2$, $R^3$ is an alkyl group of $C_6$–$C_{18}$, $R^4$ is —H, —$CH_3$ or —Cl, $R^5$ is —$CH_3$ or —$C_2H_5$, $R^6$ is —H, —$CH_3$, —$C_2H_5$ or a phenyl group, $R^7$ is —H, —$CH_3$ or —$C_2H_5$, $R^8$ is an alkyl group or a substituted alkyl group of $C_6$–$C_{18}$, each of $R^9$–$R^{14}$ is independently —H, —$CH_3$ or —$C_2H_5$, each of $R^{15}$ and $R^{16}$ is independently —H, —$CH_3$, —$C_2H_5$ or a phenyl group, $R^{17}$ is —H, —$CH_3$, —$C_2H_5$, —OH, —$NH_2$ or —$NO_2$, $R^{18}$ is an alkyl group of $C_1$–$C_4$, p is a value in the range of 2 to 80, CuPc is a copper phthalocyanine group, each of $R^{19}$ and $R^{20}$ is independently an alkyl group or a substituted alkyl group, $Y^+$ is a substituted guanidine cation, each of m and n is an integer and m+n is in the range of 2 to 4, $R^{21}$ is H or a group represented by the formula

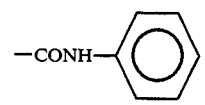

$R^{22}$ is —H, —$NO_2$ or —$CH_3$, $Z^+$ is an ammonium ion containing at least one of an alkyl group, an alkoxy-substituted alkyl group and a hydroxy-substituted alkyl group of $C_{10}$–$C_{18}$–$C_{18}$, each of $R^{23}$ and $R^{24}$ is an alkyl group of $C_1$–$C_4$, and l is an integer of 1 to 5).

A yellow ink for marking pens of the present invention comprises a yellow dye represented by the formula (I)

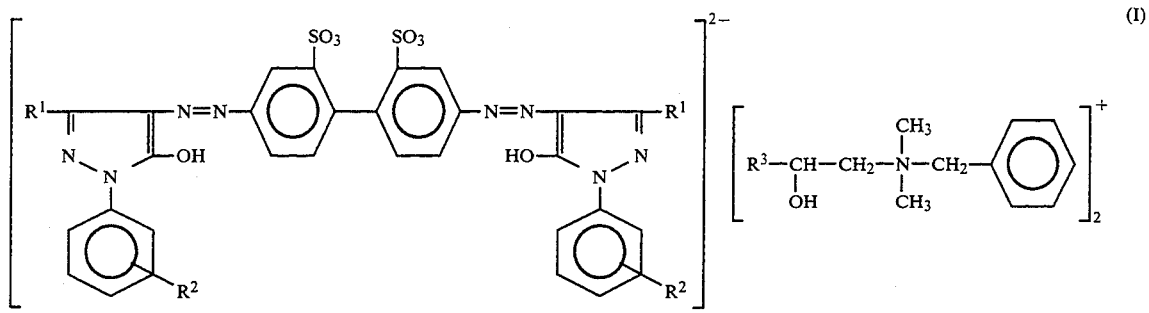

(wherein $R^1$ is $-CH_3$ or $-C_2H_5$, $R^2$ is $-H$, $-CH_3$, $-Cl$ or $-SO_2NH_2$, and $R^3$ is an alkyl group of $C_6$-$C_{18}$), an ethanol-soluble resin, and ethanol.

An orange ink for marking pens of the present invention comprises an orange dye represented by the formula (II)

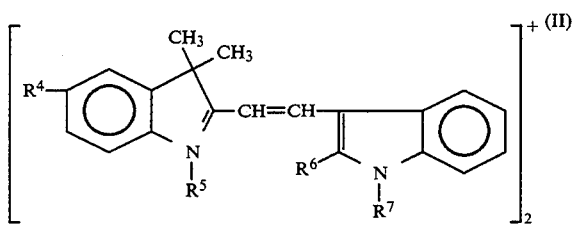

(wherein $R^4$ is $-H$, $-CH_3$ or $-Cl$, $R^5$ is $-CH_3$ or $-C_2H_5$, $R^6$ is $-H$, $-CH_3$, $-C_2H_5$ or a phenyl group, $R^7$ is $-H$, $-CH_3$ or $-C_2H_5$, and $R^8$ is an alkyl group or a substituted alkyl group of $C_6$-$C_{18}$), an ethanol-soluble resin, and ethanol.

A red ink for marking pens of the present invention comprises a red dye represented by the formula (III)

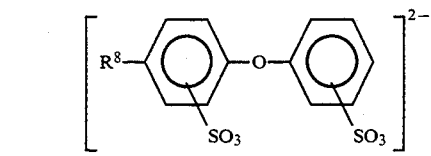

(wherein each of $R^9$ through $R^{14}$ is independently $-H$, $-CH_3$ or $-C_2H_5$, $R^1$ is $-CH_3$ or $-C_2H_5$, and $R^8$ is an alkyl group or a substituted alkyl group of $C_6$-$C_{18}$), an ethanol-soluble resin and ethanol.

A first blue ink for marking pens of the present invention comprises a blue dye represented by the formula

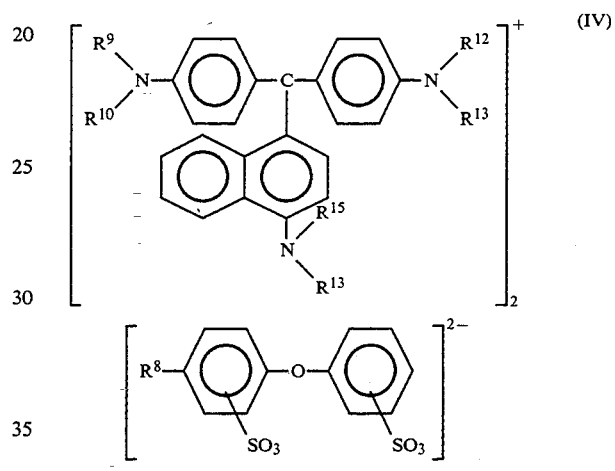

(wherein each of $R^9$, $R^{10}$, $R^{12}$ and $R^{13}$ is independently $-H$, $-CH_3$ or $-C_2H_5$, each of $R^{15}$ and $R^{16}$ is independently $-H$, $-CH_3$, $-C_2H_5$ or a phenyl group, and $R^8$ is an alkyl group or a substituted alkyl group of $C_6$-$C_{18}$), an ethanol-soluble resin, and ethanol.

A second blue ink for marking pens of the present invention comprises a blue dye represented by the formula

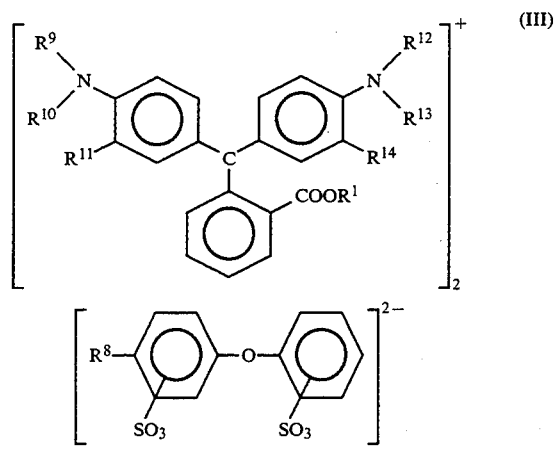

(wherein each of $R^9$, $R^{10}$, $R^{12}$ and $R^{13}$ is independently $-H$, $-CH_3$ or $-C_2H_5$, each of $R^{15}$ and $R^{16}$ is independently $-H$, $-CH_3$, $-C_2H_5$ or a phenyl group, and $R^{17}$ is $-H$, $-CH_3$, $-C_2H_5$, $-OH$, $-NH_2$ or $-NO_2$), an ethanol-soluble resin, and ethanol.

A pink ink for marking pens of the present invention comprises a pink dye represented by the formula (VI)

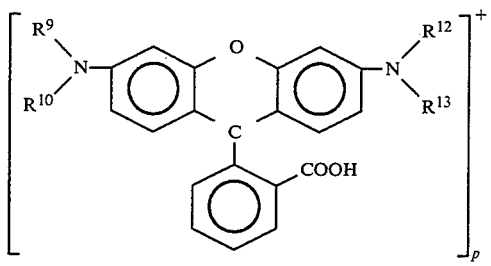

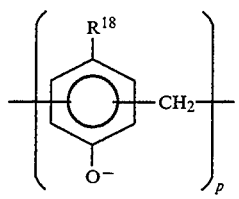

(wherein each of $R^9$, $R^{10}$, $R^{12}$ and $R^{13}$ is independently —H, —CH$_3$ or —C$_2$H$_5$, $R^{18}$ is an alkyl group of $C_1$–$C_4$, and p is a value in the range of 2 to 80), an ethanol-soluble resin, and ethanol.

A sky-blue ink for marking pens of the present invention comprises a sky-blue dye represented by the formula (VII)

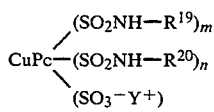

(CuPc is a copper phthalocyanine group, each of $R^{19}$ and $R^{20}$ is independently an alkyl group or a substituted alkyl group, $Y^+$ is a substituted guanidine cation, each of m and n is an integer and m+n is in the range of 2 to 4), an ethanol-soluble resin, and ethanol.

A first black ink for marking pens of the present invention comprises a black dye represented by the formula (VIII)

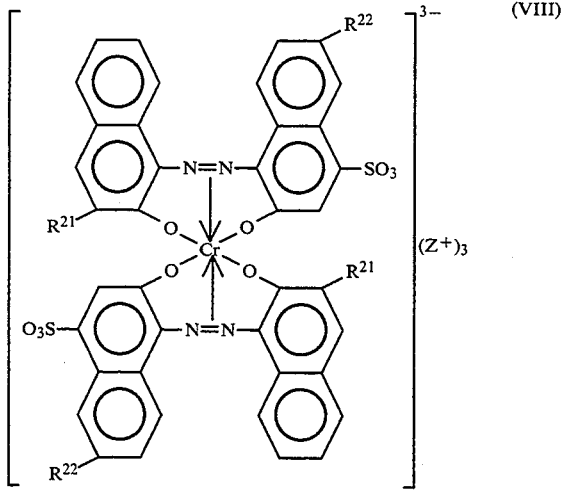

($R^{21}$ is H or a group represented by the formula

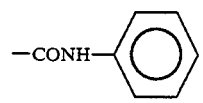

$R^{22}$ is —H, —NO$_2$ or —CH$_3$, and $Z^+$ is an ammonium ion containing at least one of an alkyl group, an alkoxy-substituted alkyl group and a hydroxy-substituted alkyl group of $C_{10}$–$C_{18}$), an ethanol-soluble resin, and ethanol.

A second black ink for marking pens of the present invention comprises a black dye represented by the formula (IX)

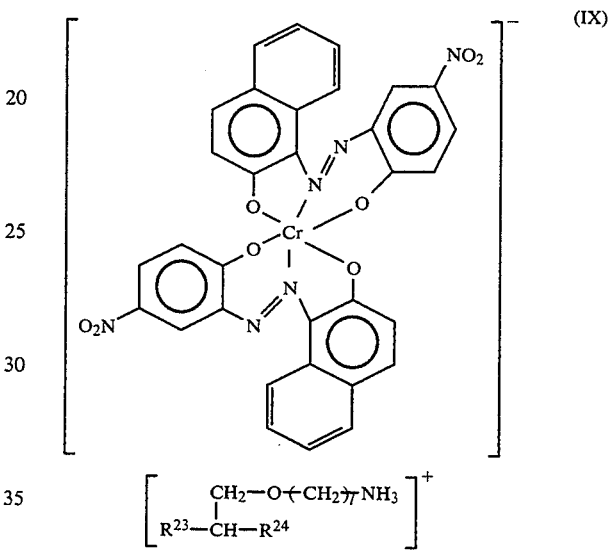

(each of $R^{23}$ and $R^{24}$ is an alkyl group of $C_1$–$C_4$, and l is an integer of 1 to 5), an ethanol-soluble resin, and ethanol.

A third black ink for marking pens of the present invention comprises a dye of Color Index No. Solvent Black 7, an ethanol-soluble resin, ethanol and a fatty acid.

No particular restriction is put on the content of the dye which can be used in the ink of the present invention, but it is in the range of 1 to 20% by weight, preferably 1 to 15% by weight based on the total weight of the ink from the viewpoint of an ink viscosity. In the case that Color Index No. Solvent Black 7 is used, the content of the dye is preferably in the range of 1 to 15% by weight. Alternatively, another ethanol-soluble dye may be used in such an amount as not to impair the above-mentioned object.

Ethanol which can be used in the ink of the present invention is employed as a main solvent.

No particular restriction is put on this ethanol, but ethanol whose 99% or more is unmodified is preferably used. The content of ethanol is in the range of 65 to 98% by weight based on the total weight of the ink. In addition to ethanol, another solvent may be used as an auxiliary solvent such as a whitening inhibitor. However, the amount of ethanol in the total solvents is 90% by weight or more, preferably 95% by weight or more.

The ethanol-soluble resin which can be used in the ink of the present invention is an ethanol-soluble alkyl-phenol resin having a softening point of 60° to 100° C.

or an ethanol-soluble ketone resin having a softening point of 60° to 100° C. Typical examples of the ethanol-soluble alkylphenol resin having a softening point of 60° to 100° C. include "HITANOL 2501" (softening point=75°-90° C.; made by Hitachi Chemical CO., Ltd.) and "TAMANOL PA" (softening point=90°-100° C.; made by Arakawa Chemical Industry Co., Ltd.). Furthermore, a typical example of the ethanol-soluble ketone resin having a softening point of 60° to 100° C. is "KETONERESIN K90" (softening point=85°-100° C.; made by Arakawa Chemical Industry Co., Ltd.). These resins can improve fixing properties of written lines to a non-absorptive surface and drying resistance of a pen core. No particular restriction is put on the amount of the resin to be added, so long as it is suitable for the required fixing properties and drying resistance of the pen core. Preferably, the amount of the resin is in the range of 1 to 15% by weight based on the total weight of the ink in consideration of an ink viscosity.

The fatty acid which can be used in the ink of the present invention functions as a solubilization agent, and typical examples of the fatty acid include oleic acid, 2-ethylhexanoic acid and caprylic acid. The amount of the fatty acid to be added is preferably in the range of 1 to 5% by weight based on the weight of the total. ink. This fatty acid is used in the case that Color Index No. Black 7 is employed.

Examples of the dyes which can be used in the ink for marking pens of the present invention are as follows.

Typical examples of the yellow dye represented by the formula (I) include compounds represented by the following formulae:

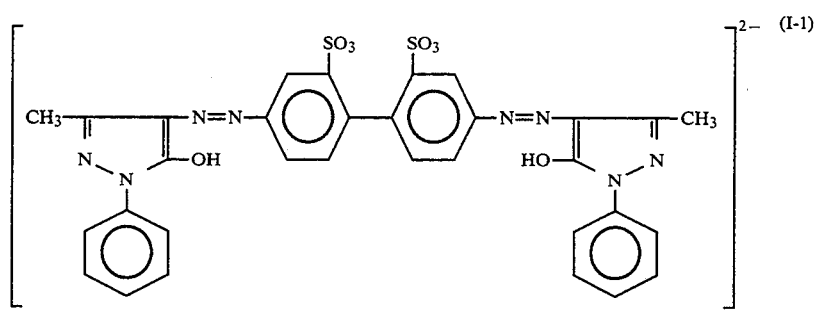

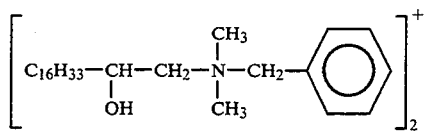

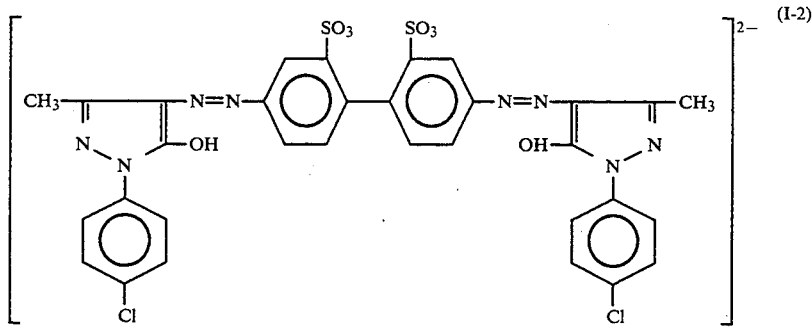

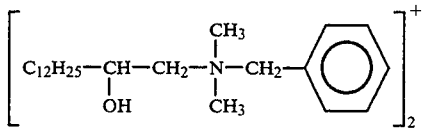

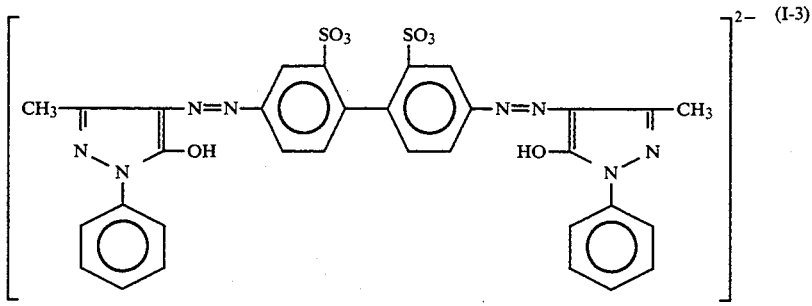

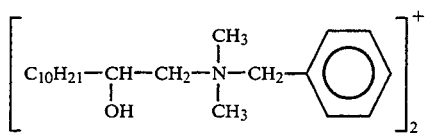
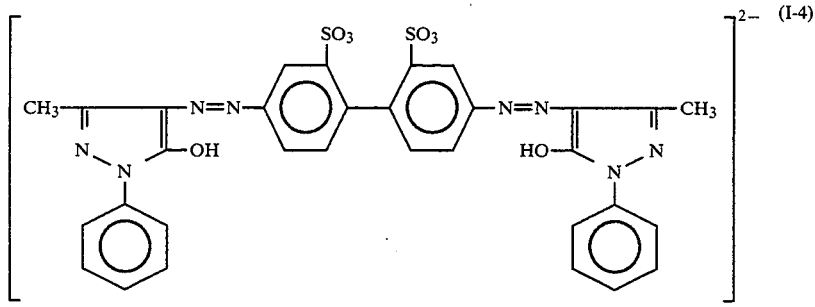
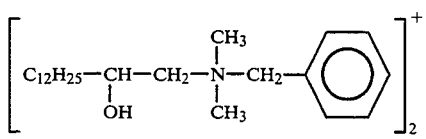
Typical examples of the orange dye represented by formula (II) include compounds represented by the following formulae:
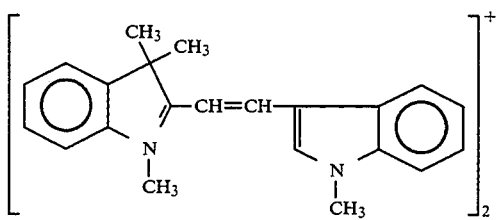
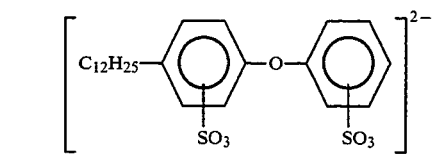
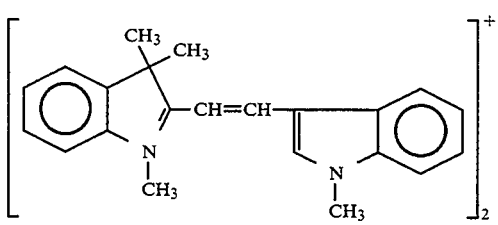
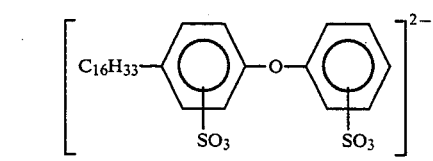
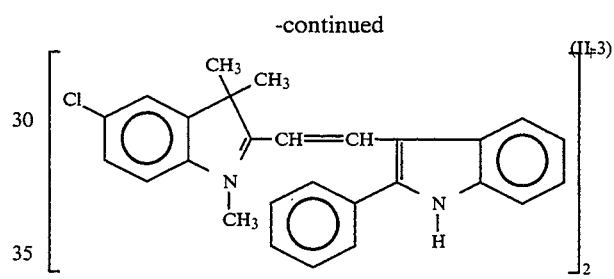
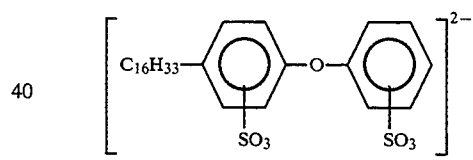
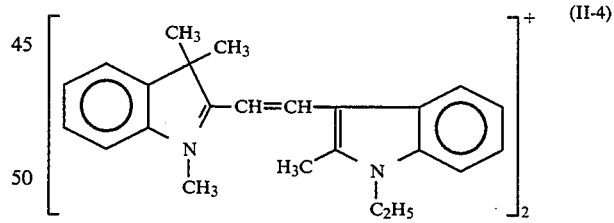
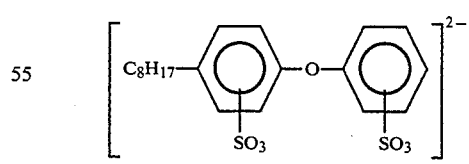
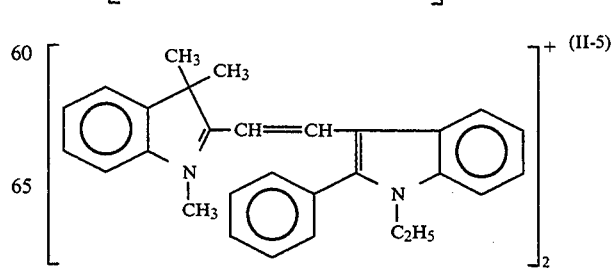

-continued
Typical examples of the red dye represented by the formula (III) include compounds represented by the following formulae:
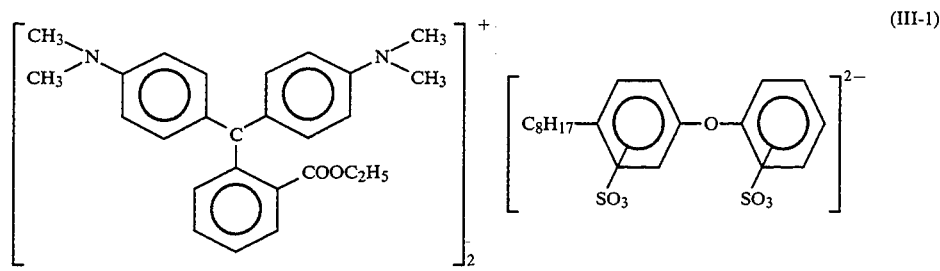
(III-1)
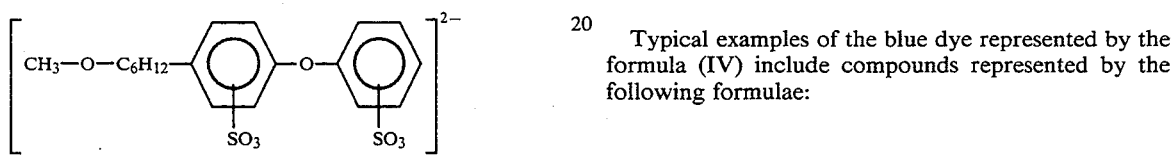
Typical examples of the blue dye represented by the formula (IV) include compounds represented by the following formulae:
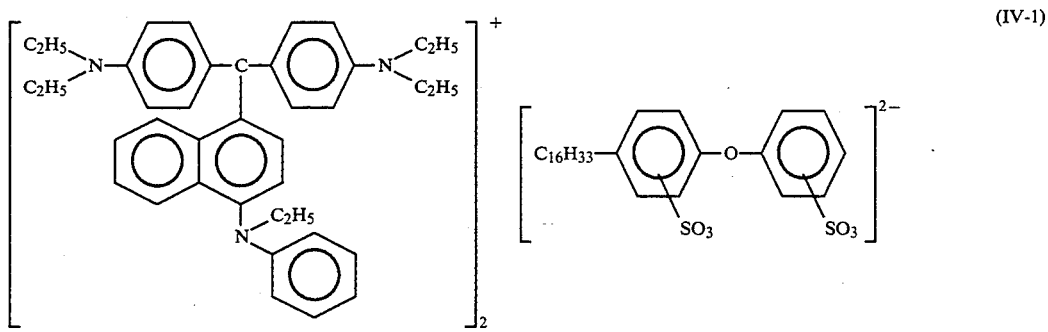
(IV-1)
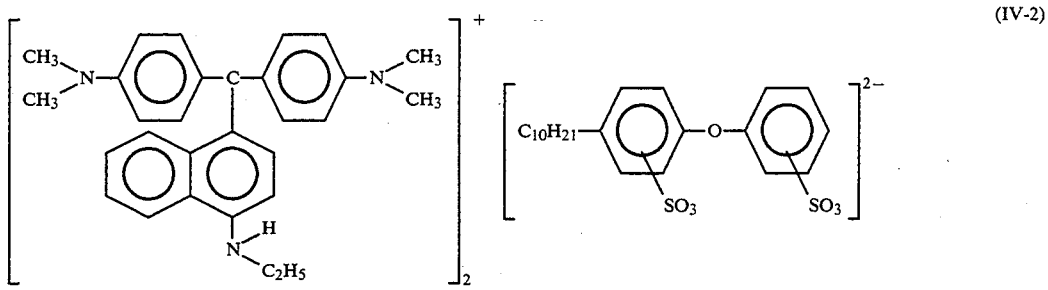
(IV-2)
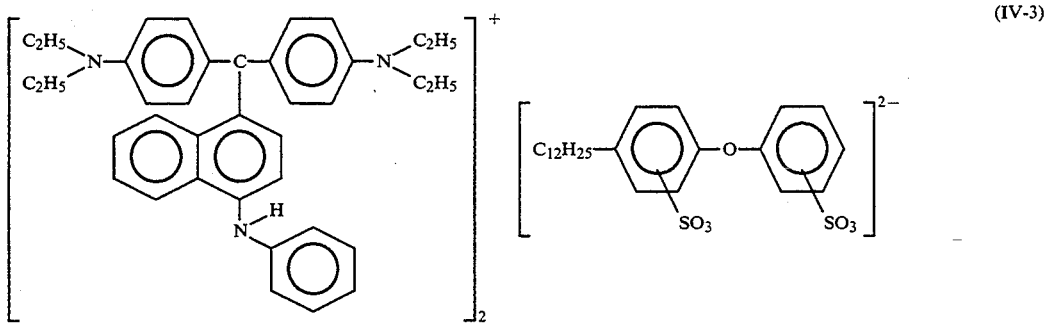
(IV-3)

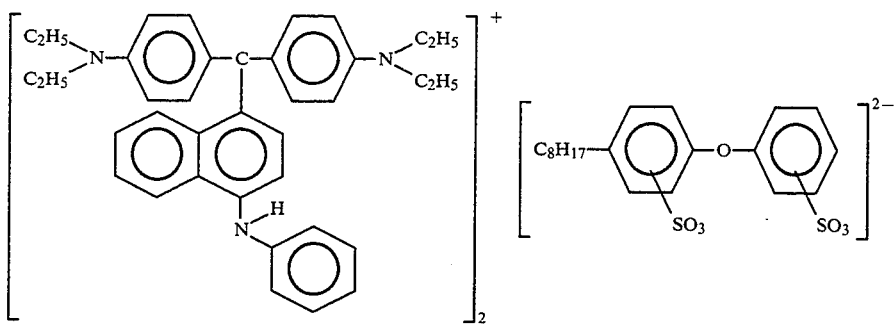
(IV-4)
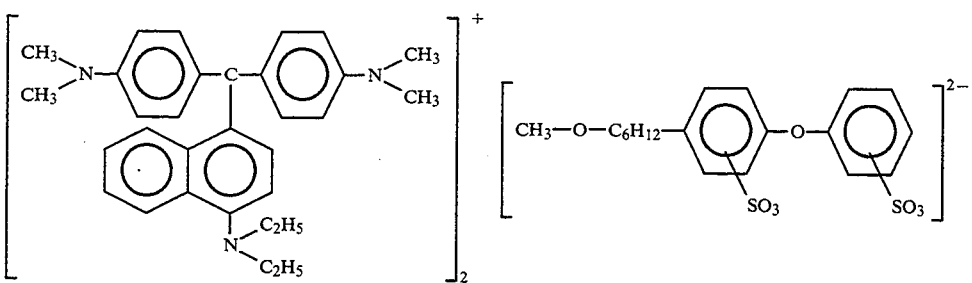
(IV-5)
Typical examples of the blue dye represented by the formula (V) include compounds represented by the following formulae:
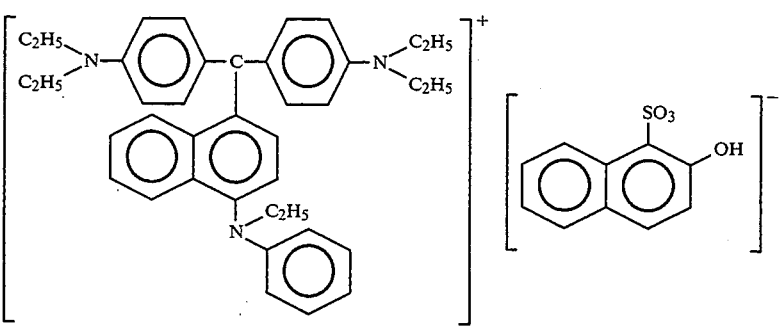
(V-1)
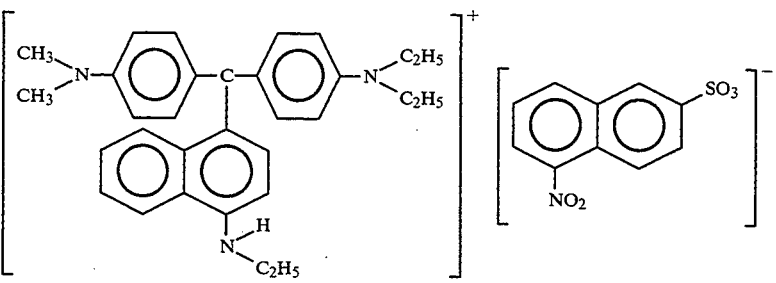
(V-2)
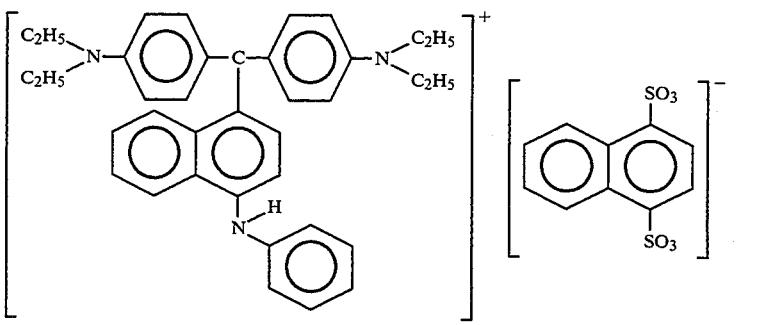
(V-3)

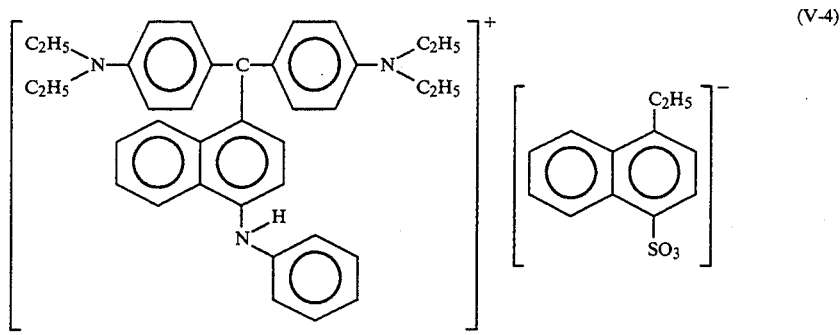
(V-4)
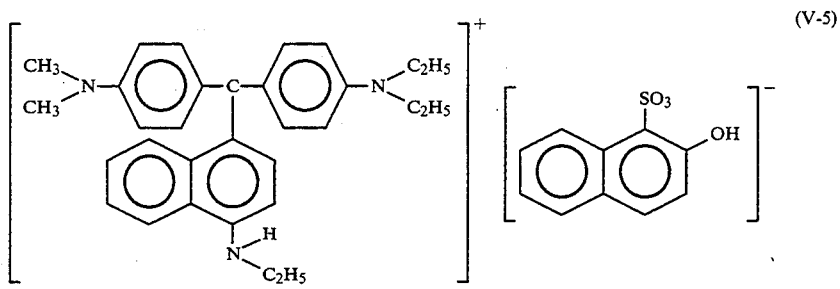
(V-5)
Typical examples of the pink dye represented by the formula (VI) include compounds represented by the following formulae:
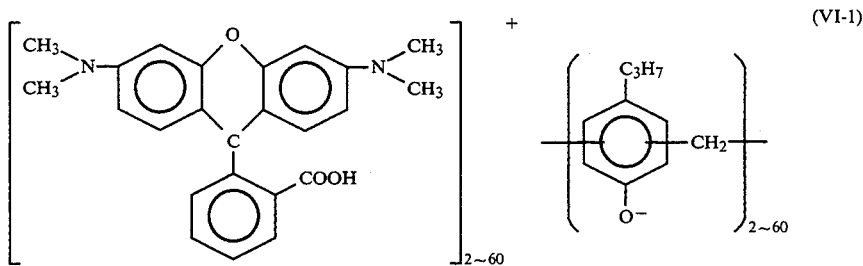
(VI-1)
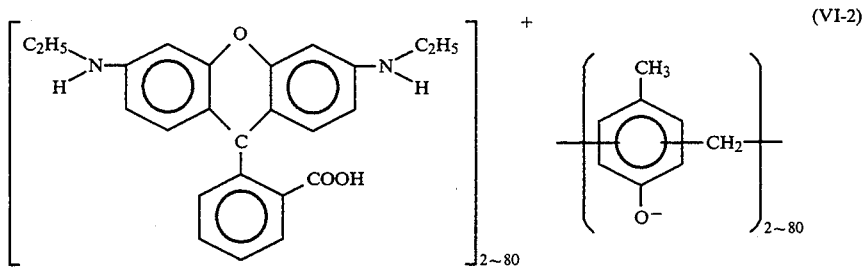
(VI-2)
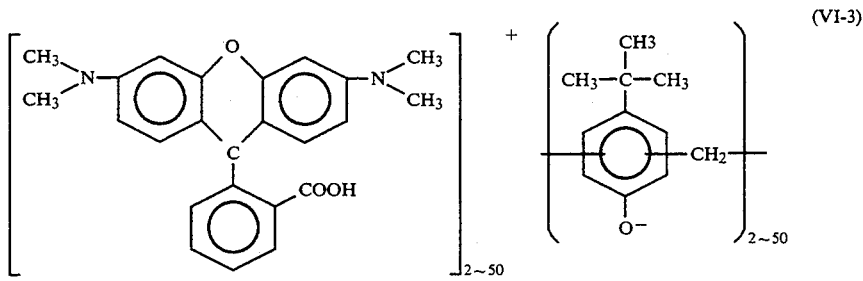
(VI-3)

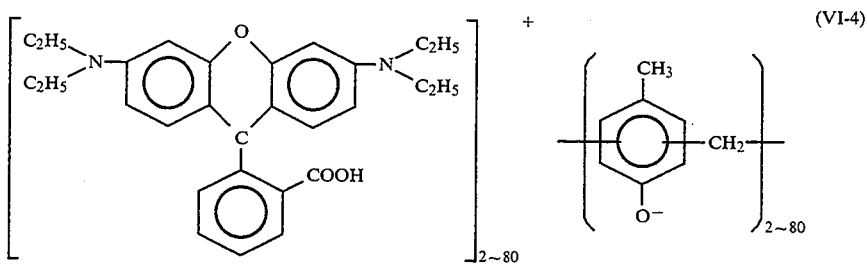 (VI-4)

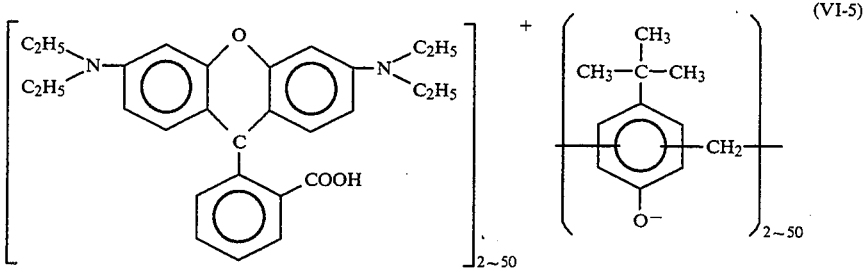 (VI-5)

Typical examples of the sky-blue dye represented by the formula (VII) include compounds represented by the following formulae:

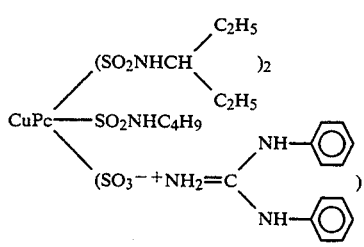 (VII-1)

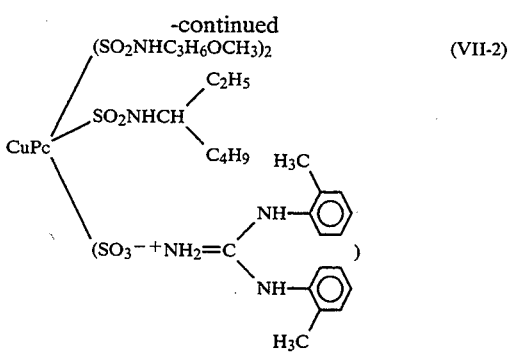 (VII-2)

The black dye represented by the formula (VIII) is a compound in which an ammonium ion $Z^+$ in this formula contains at least one of alkyl groups, alkoxy-substituted alkyl group and hydroxy-substituted alkyl groups having 10 to 18 carbon atoms such as dodecyl, octadecyl, 2-hydroxydodecyl, 2-hydroxytetradecyl, hexadecyl methoxydodecyl and the like.

The typical examples of this black dye include compounds represented by the formulae:

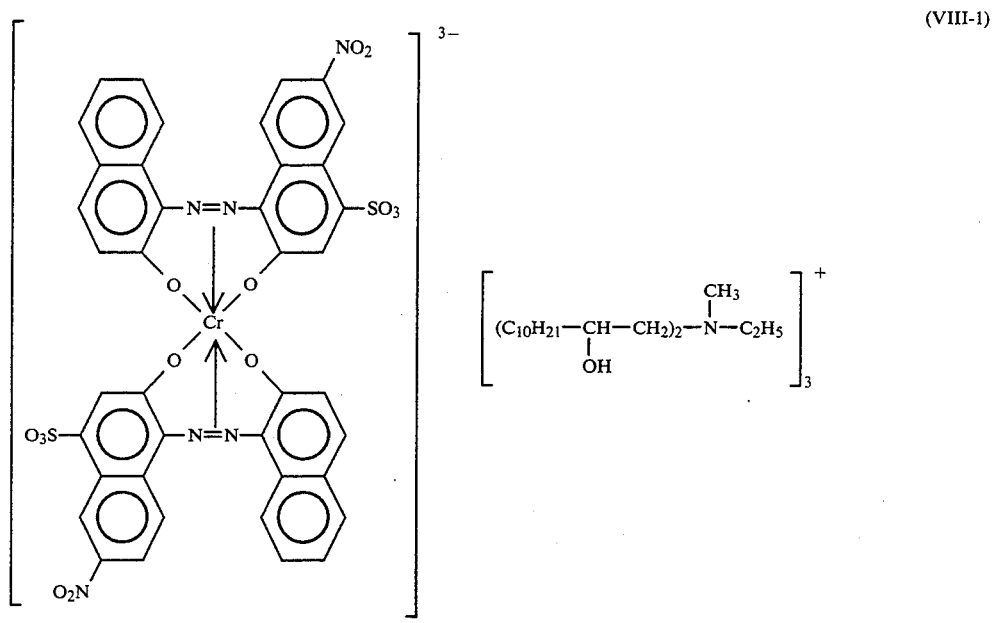
(VIII-1)
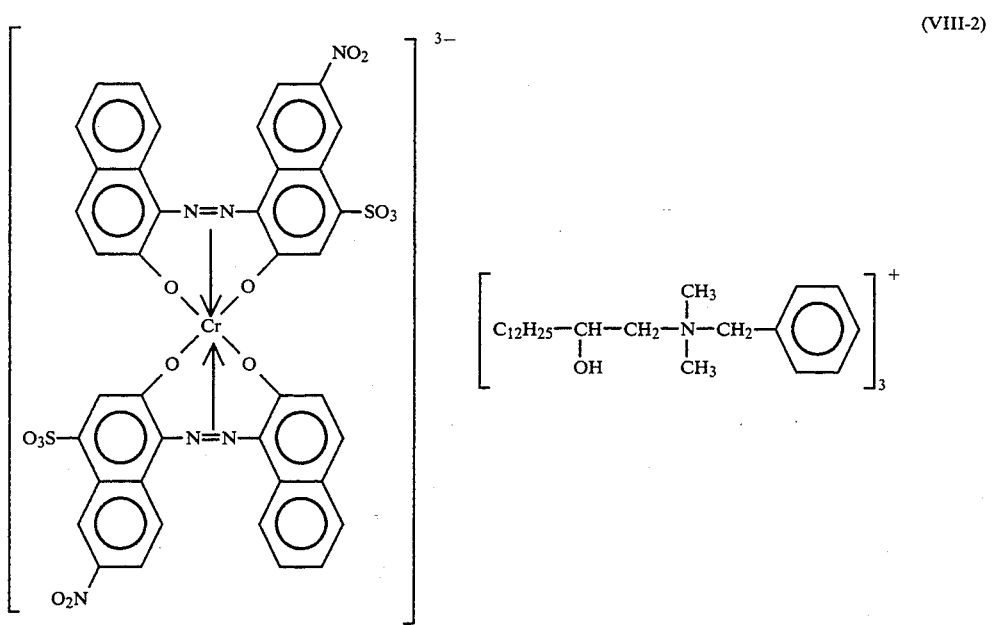
(VIII-2)

-continued
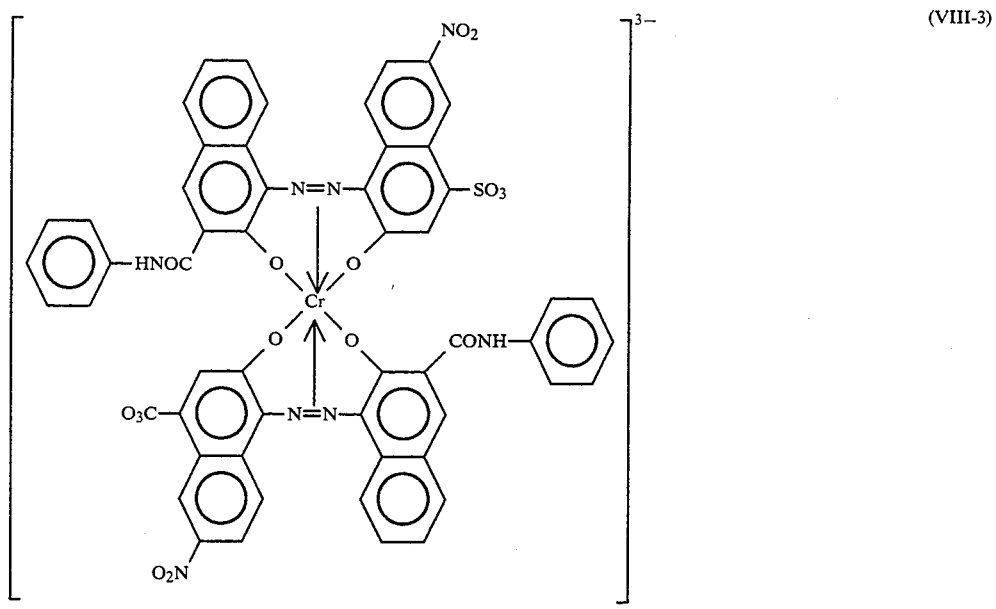
(VIII-3)
[CH₃OC₁₂H₂₄NH₃]₃⁺
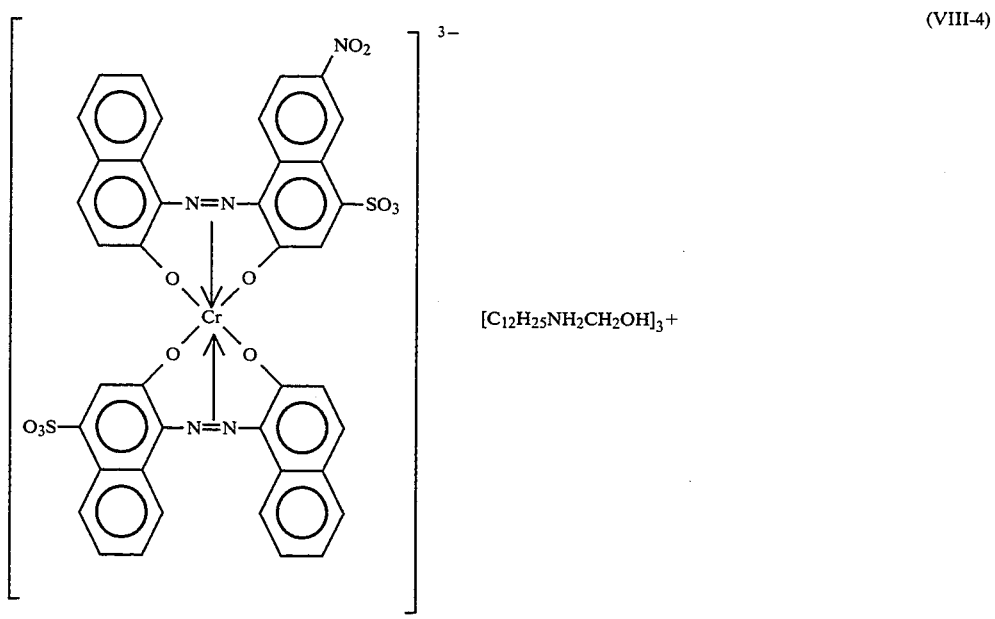
(VIII-4)
[C₁₂H₂₅NH₂CH₂OH]₃⁺

(VIII-5)
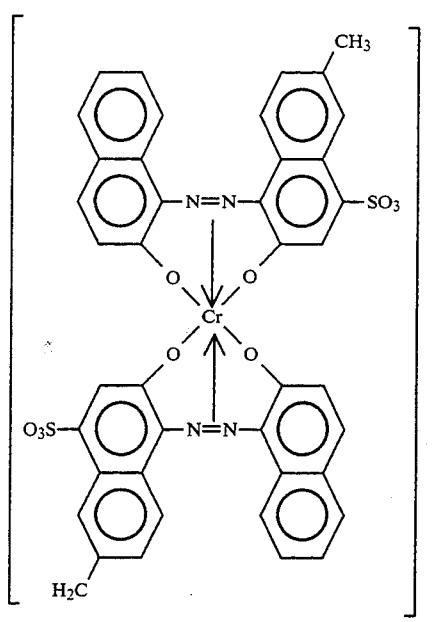
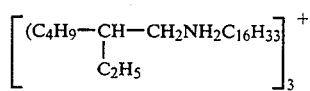
(VIII-6)
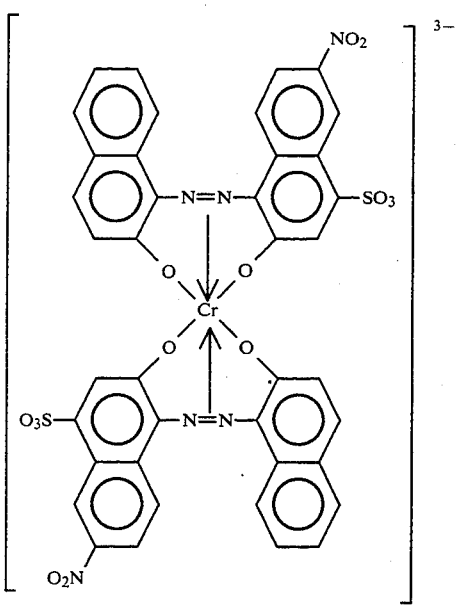
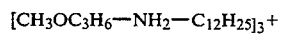
Typical examples of the black dye represented by the formula (IX) include compounds represented by the following formulae:
(IX-1)
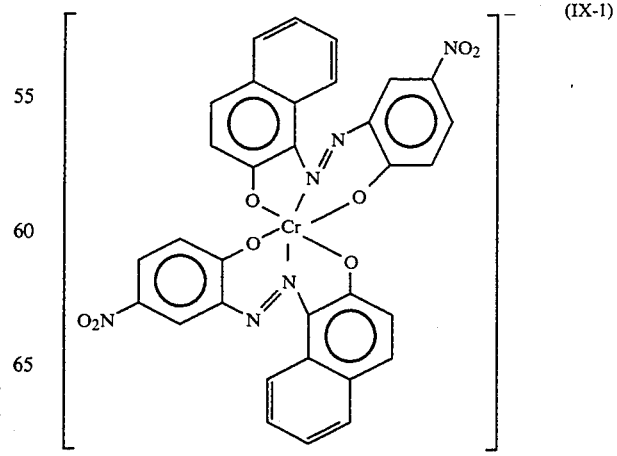

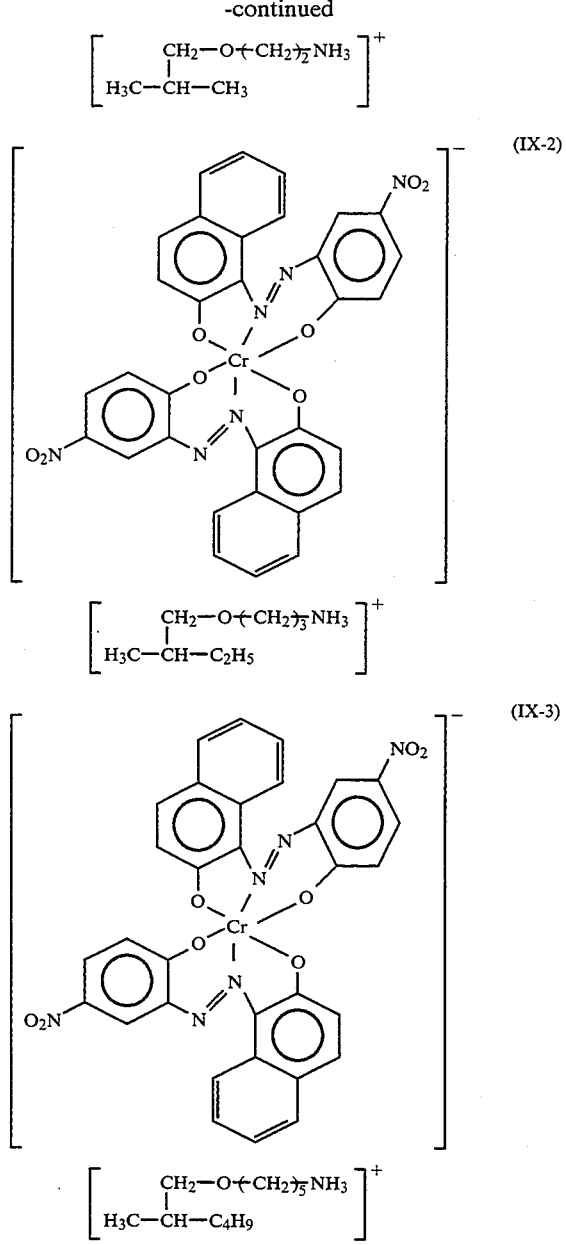

In the dye for use in the yellow ink of the present invention, a cationic component has a straight-chain alkyl group and a polar hydroxyl group as shown in the formula (I) and a chromophore has a good compatibility with an alcohol, and thus the solubility of this dye in ethanol is excellent. In addition, this dye is excellent in stability with time to ethanol. Since being based on a diazo compound, this dye has high direct dyeing properties to paper. Moreover, this dye forms a salt together with a straight-chain alkylammonium, and therefore, it can be considered that written lines are inhibited from dissolving in water to improve water resistance. The water resistance on a non-absorptive surface is considered to be attributable to the fact that the dye is well compatible with the ethanol-soluble resin.

In the dyes for use in the orange ink and the red ink of the present invention, an anionic component has a straight-chain alkyl group as shown in the formulae (II) and (III) and a chromophore has a good compatibility with an alcohol, and thus it can be considered that the solubility of these dyes in ethanol is excellent and the dyes are excellent in stability with time to ethanol.

Furthermore, these dyes are salt-forming dyes in which a diphenyl ether sulfonic acid having a straight-chain alkyl group is used as an anion, and therefore they are highly soluble in ethanol but less soluble in water. In consequence, when they are used for writing on a paper, it can be considered that ethanol in the written line vaporizes to exert a strong affinity for the paper, so that they are not dissolved in water and thus water resistance is improved. The water resistance on the non-absorptive surface is considered to be attributable to the fact that the dye is well compatible with the ethanol-soluble resin.

The dye for use in the first blue of the present invention is a salt-forming dye of a triallylmethane-based chromophore having a naphthalene skeleton and a diphenyl ether disulfonic acid having a straight-chain alkyl group, as shown in the formula (IV). The salt-forming dye comprising this combination has a large compatibility with an alcohol, and particularly in the case of an ethanol solution of the dye, it is considered that its stability with time is excellent. In addition, this dye is highly soluble in an alcohol but less soluble in water, and so after writing, ethanol which is the solvent vaporizes, so that the dye exerts a strong affinity for a paper and does not dissolve in water any more. For this reason, it can be considered that the water resistance of the dye is improved. The water resistance on the non-absorptive surface is considered to be attributable to the fact that the dye is well compatible with the ethanol-soluble resin.

The dye for use in the second blue of the present invention is a salt-forming dye of a triallylmethane-based chromophore having a naphthalene skeleton and naphthalenesulfonic acid, as shown in the formula (V). The salt-forming dye comprising this combination has a large compatibility with an alcohol, and particularly in the case of an ethanol solution of the dye, it is considered that its stability with time is excellent. In addition, this dye is well soluble in an alcohol but less soluble in water, and therefore, it can be considered that written lines are inhibited from dissolving in water to improve water resistance. The water resistance on the non-absorptive surface is considered to be attributable to the fact that the dye is well compatible with the ethanol-soluble resin.

In the dye for use in the pink ink of the present invention, an anionic component is a formaldehyde polymer of an alkylphenol, and a chromophore has a good compatibility with an alcohol, and thus it can be considered that the solubility of the dye in ethanol and the stability of the dye with time to ethanol are excellent. This dye is a salt-forming dye of a cationic dye and a formaldehyde polymer of an alkylphenol, and therefore it is highly soluble in ethanol but less soluble in water. In consequence, it is considered that when the ink is used for writing on a paper, ethanol in the written line vaporizes to exert a strong affinity for the paper, so that the ink is inhibited from dissolving in water to improve water resistance. The water resistance on the non-absorptive surface is considered to be attributable to the fact that the dye is well compatible with the ethanol-soluble resin.

The dye represented by the formula (VII) which can be used in the sky-blue ink of the present invention has a substituent for structurally improving the solubility of the dye in an alcohol, and therefore it seems that the solubility of the dye particularly in ethanol is high and the stability with time of an ethanol solution is also excellent. In addition, this dye is well soluble in an alcohol but less soluble in water, and therefore written lines are inhibited from dissolving in water to improve water resistance. The water resistance on the non-absorptive surface is considered to be attributable to the fact that the dye is well compatible with the ethanol-soluble resin.

The black dye represented by the formula (VIII) for use in the ink of the present invention has a salt structure obtained from a metal complex salt dye and a quaternary ammonium having a straight-chain alkyl group, an alkoxy-substituted alkyl group or a hydroxy-substituted alkyl group of 10-16 carbon atoms as a cation, and therefore the solubility of this dye in ethanol is high and the stability with time of the ink is excellent. In addition, the solubility of the ink in water is low, so that the water resistance of the ink is excellent. In consequence, when the ink is used for writing on a paper, ethanol in the written line vaporizes to exert a strong affinity for the paper, so that the ink is inhibited from dissolving in water to improve the water resistance of the ink.

The black dye represented by the formula (IX) for use in the black ink of the present invention has a salt structure obtained from a metal complex salt dye and a quaternary ammonium having a straight-chain alkylene, and therefore it is considered that the solubility of this dye in ethanol is high and the stability with time of the ink is excellent. In addition, since the dye is a specific salt-forming dye using ammonium having a straight-chain alkylene group as a cation, this dye is well soluble in an alcohol but less soluble in water. In consequence, when the ink is used for writing on a paper, it can be considered that ethanol in the written line vaporizes to exert a strong affinity for the paper, so that the ink is inhibited from dissolving in water to improve water resistance.

The black ink using Color Index No. Solvent Black 7 of the present invention has extremely good fixing properties to a metal. This reason is not definite but it can be presumed as follows.

A nigrosine dye which has been used in a conventional ink for marking pens has a good solubility to a solvent such as xylene and the like, but the orientation of the dye to a metal surface is slower than that of a fatty acid of a solubilizer. Therefore, it is considered that the fatty acid is previously oriented on the metal surface, which makes the fixing properties of the dye poor. However, when dissolved in ethanol, Color Index No. Solvent Black 7 shows a behavior other than when dissolved in xylene, and this dye is oriented to the metal surface more rapidly than the fatty acid. For this reason, it can be considered that the fixing properties of this dye are better than the conventional nigrosine dye.

The dyes represented by the formulae (I) to (VIII) are manufactured and sold by HODOGAYA CHEMICAL CO., LTD.

BEST MODE FOR CARRYING OUT THE INVENTION

[EXAMPLES]

Next, an ink for marking pens of the present invention will be described in reference to examples. In the respective examples, "part(s)" means "part(s) by weight".

For inks obtained in the examples, some tests were carried out as follows.

Stability of ink:

Each of the inks obtained the examples was sampled by a syringe, and some droplets of the ink were then dropped on a filter paper (FILTER PAPER QUALITATIVE "ADVANTEC TOYO No.2" made by Toyo Roshi Kisha, Ltd.). At this time, it was observed by the naked eye whether or not a dye precipitated. The ink which did not precipitate was evaluated to be ○, and the ink which precipitated even slightly was evaluated to be ×.

Stability with time:

Each ink was placed in a 100 ml glass bottle with a tight stopper, and it was then allowed to stand at −20° C. and 60° C. for 3 days. Afterward, a spot test (several droplets of the ink sampled from the bottom of the ink were dropped on a filter paper (FILTER PAPER QUALITATIVE "ADVANTEC TOYO No.2" made by Toyo Roshi Kisha, Ltd.), and it was observed by the naked eye whether or not a dye precipitated. The ink which did not precipitate was evaluated to be ○, and the ink which precipitated even slightly was evaluated to be ×.

Water resistance:

Each ink was dropped on a filter paper (FILTER PAPER QUALITATIVE "ADVANTEC TOYO No.2" made by Toyo Roshi Kisha, Ltd.) and then air-dried, and several droplets of pure water were dropped from a height of 3 cm. At this time, a bleeding state was observed by the naked eye.

When the bleeding was not confirmed, the dye was evaluated to be ○, and when even the slight bleeding was confirmed, the dye was evaluated to be ×.

Fixing test:

A marking pen using a felt tip ("Mitsubishi oily marker [Pi:s]") was filled with each of the inks obtained in the examples, and a straight line was directly written on the washed surface of a brass plate with the marking pen. The written line was allowed to stand about overnight and then lightly rubbed with a cotton swab. When the written line disappeared by 5 or less rubbing operations, the dye was evaluated to be ×, and when the written line disappeared by 6–10 rubbing operations, the dye was evaluated to be △, and when the written line did not disappear even by 11 or more rubbing operations, the dye was evaluated to be ○.

Example 1

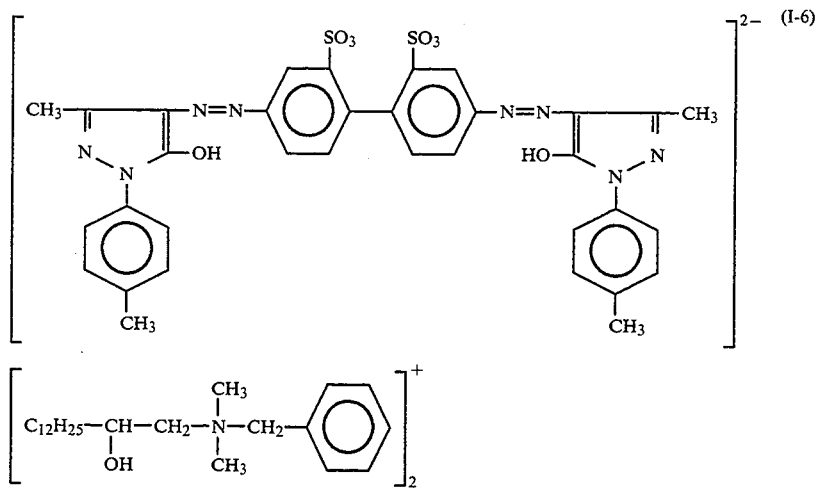

To 80 parts of unmodified ethanol were added 10 parts of a yellow dye represented by the above-mentioned formula and 10 parts of an ethanol-soluble resin (trade name "TAMANOL PA"; made by Arakawa Chemical Industry Co., Ltd.), and the mixture was then stirred for 1 hour to obtain an ethanol-based yellow ink for marking pens.

Example 2

To 78 parts of unmodified ethanol were added 12 parts of a yellow dye represented by the above-mentioned formula and 10 parts of an ethanol-soluble resin (trade name "KETONERESIN K90"; made by Arakawa Chemical Industry Co., Ltd.), and the mixture was then stirred for 1 hour to obtain an ethanol-based yellow ink for marking pens.

Example 3

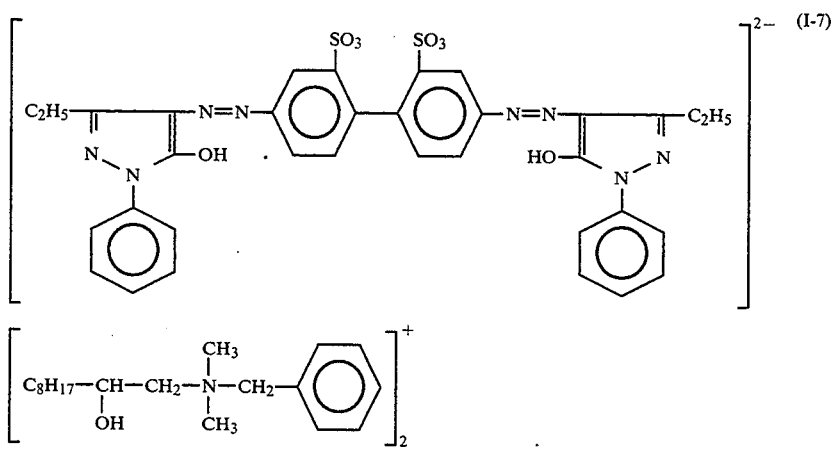

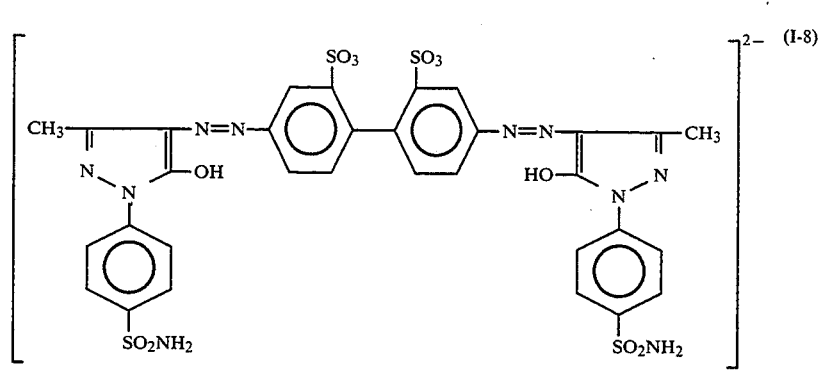

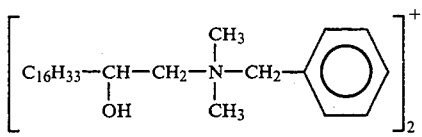

To a mixture of 77 parts of unmodified ethanol and 5 parts of benzyl alcohol were added 8 parts of a yellow dye represented by the above-mentioned formula and 10 parts of an ethanol-soluble resin (trade name "KETONERESIN K90"; made by Arakawa Chemical Industry Co., Ltd.), and the mixture was then stirred for 1 hour to obtain an ethanol-based yellow ink for marking pens.

Example 4

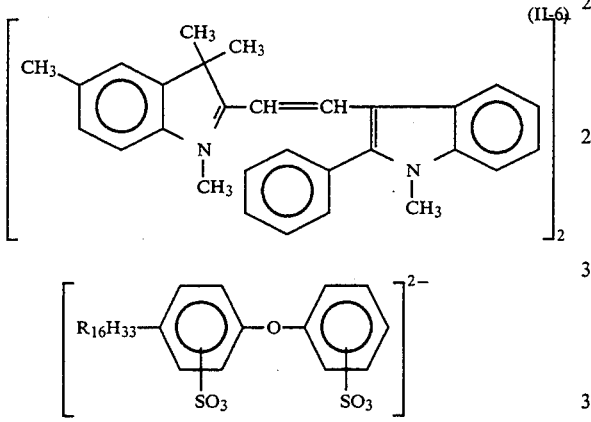

To 80 parts of unmodified ethanol were added 8 parts of an orange dye represented by the above-mentioned formula and 12 parts of an ethanol-soluble resin (trade name "TAMANOL 510"; made by Arakawa Chemical Industry Co., Ltd.), and the mixture was then stirred for 1 hour to obtain an ethanol-based orange ink for marking pens.

Example 5

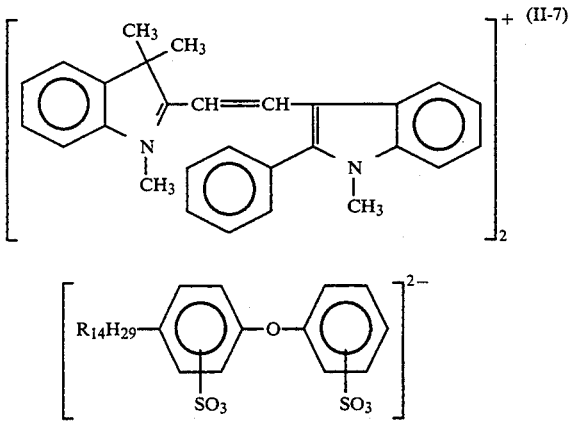

To 75 parts of unmodified ethanol were added 12 parts of an orange dye represented by the above-mentioned formula and 13 parts of an ethanol-soluble resin (trade name "KETONERESIN K90"; made by Arakawa Chemical Industry Co., Ltd.), and the mixture was then stirred for 1 hour to obtain an ethanol-based orange ink for marking pens.

Example 6

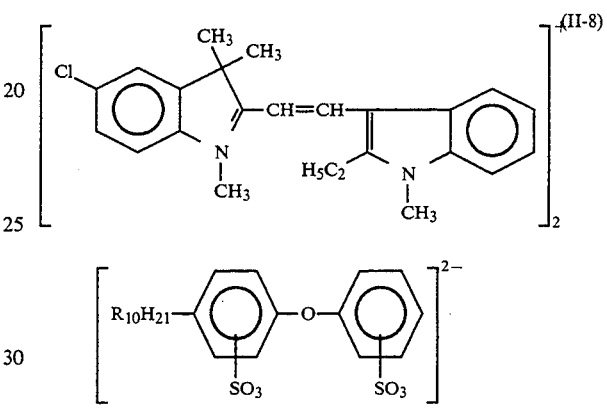

To a mixture of 75 parts of unmodified ethanol and 5 parts of n-propyl alcohol were added 10 parts of an orange dye represented by the above-mentioned formula and 10 parts of an ethanol-soluble resin (trade name "KETONERESIN K90"; made by Arakawa Chemical Industry Co., Ltd.), and the mixture was then stirred for 1 hour to obtain an ethanol-based orange ink for marking pens.

Example 7

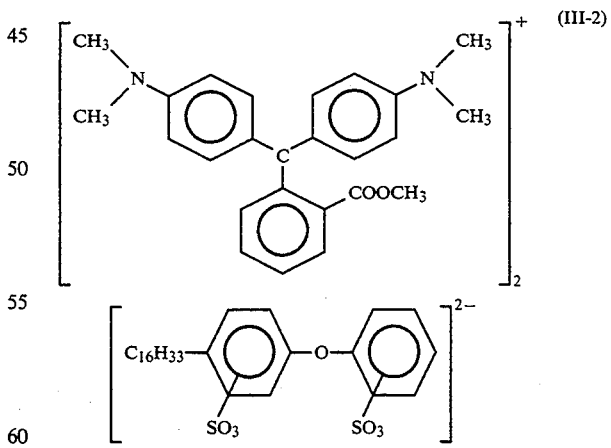

To 78 parts of unmodified ethanol were added 12 parts of a red dye represented by the above-mentioned formula and 10 parts of an ethanol-soluble resin (trade name "TAMANOL 510"; made by Arakawa Chemical Industry Co., Ltd.), and the mixture was then stirred for 1 hour to obtain an ethanol-based red ink for marking pens.

Example 8

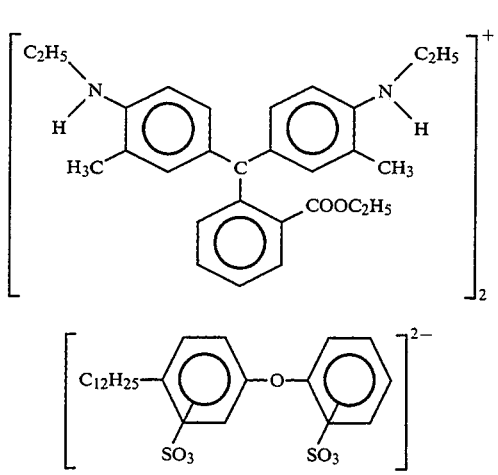

To 75 parts of unmodified ethanol were added 12 parts of a red dye represented by the above-mentioned formula and 13 parts of an ethanol-soluble resin (trade name "HILACK 110H"; made by Hitachi Chemical Co., Ltd.), and the mixture was then stirred for 1 hour to obtain an ethanol-based red ink for marking pens.

Example 9

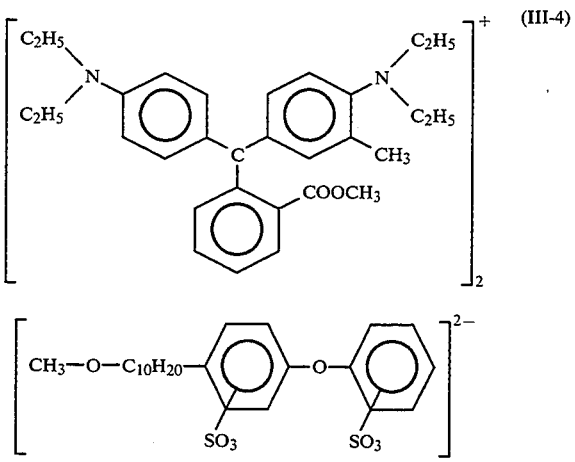

To a mixture of 75 parts of unmodified ethanol and 3 parts of isopropyl alcohol were added 12 parts of a red dye represented by the above-mentioned formula and 10 parts of an ethanol-soluble resin (trade name "KETONERESIN K90"; made by Arakawa Chemical Industry Co., Ltd.), and the mixture was then stirred for 1 hour to obtain an ethanol-based red ink for marking pens.

Example 10

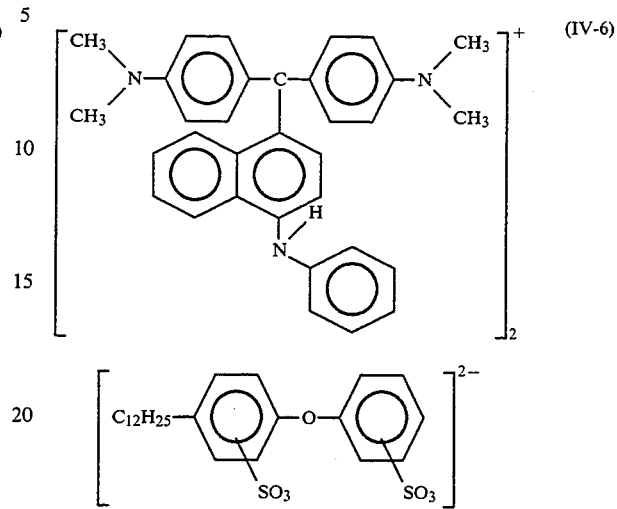

To 84 parts of unmodified ethanol were added 6 parts of a blue dye represented by the above-mentioned formula and 10 parts of an ethanol-soluble resin (trade name "TAMANOL 510"; made by Arakawa Chemical Industry Co., Ltd.), and the mixture was then stirred for 1 hour to obtain an ethanol-based blue ink for marking pens.

Example 11

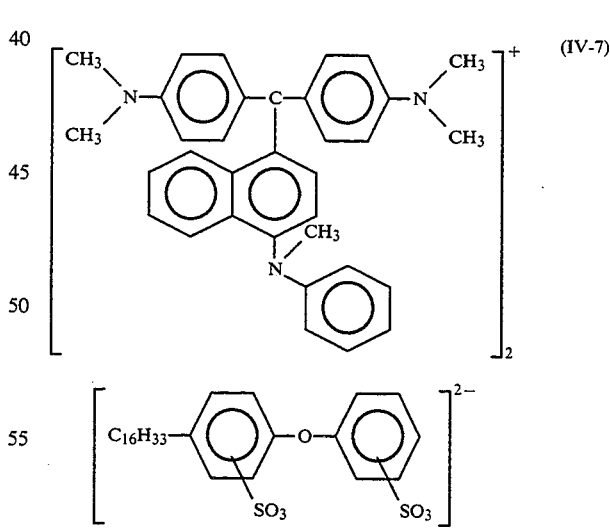

To 75 parts of unmodified ethanol were added 10 parts of a blue dye represented by the above-mentioned formula and 15 parts of an ethanol-soluble resin (trade name "HILACK 110H"; made by Hitachi Chemical Co., Ltd.), and the mixture was then stirred for 1 hour to obtain an ethanol-based blue ink for marking pens.

Example 12

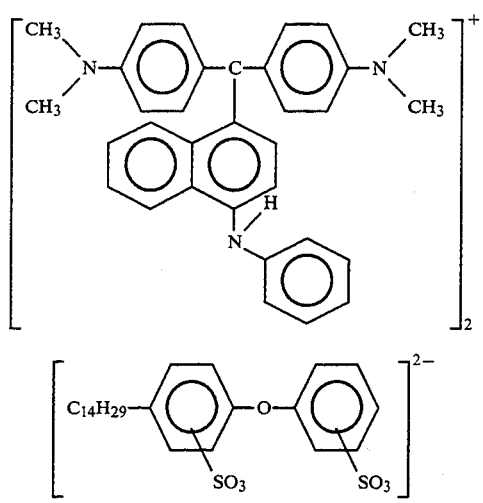 (IV-8)

To a mixture of 75 parts of unmodified ethanol and 5 parts of n-propyl alcohol were added 12 parts of a blue dye represented by the above-mentioned formula and 10 parts of an ethanol-soluble resin (trade name "KETONERESIN K90"; made by Arakawa Chemical Industry Co., Ltd.), and the mixture was then stirred for 1 hour to obtain an ethanol-based blue ink for marking pens.

Example 13

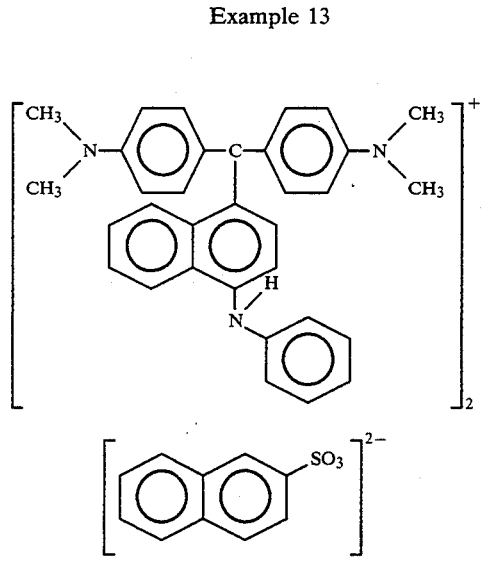 (V-6)

To 84 parts of unmodified ethanol were added 4 parts of a blue dye represented by the above-mentioned formula and 12 parts of an ethanol-soluble resin (trade name "TAMANOL 510"; made by Arakawa Chemical Industry Co., Ltd.), and the mixture was then stirred for 1 hour to obtain an ethanol-based blue ink for marking pens.

Example 14

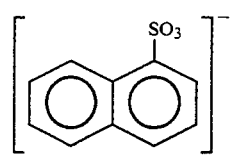 (V-7)

To 80 parts of unmodified ethanol were added 10 parts of a blue dye represented by the above-mentioned formula and 10 parts of an ethanol-soluble resin (trade name "HILACK 110H"; made by Hitachi Chemical Co., Ltd.), and the mixture was then stirred for 1 hour to obtain an ethanol-based blue ink for marking pens.

Example 15

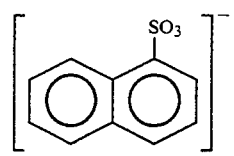 (V-8)

To a mixture of 75 parts of unmodified ethanol and 5 parts of n-propyl alcohol were added 12 parts of a blue dye represented by the above-mentioned formula and 10 parts of an ethanol-soluble resin (trade name "KETONERESIN K90"; made by Arakawa Chemical Industry Co., Ltd.), and the mixture was then stirred for 1 hour to obtain an ethanol-based blue ink for marking pens.

Example 16

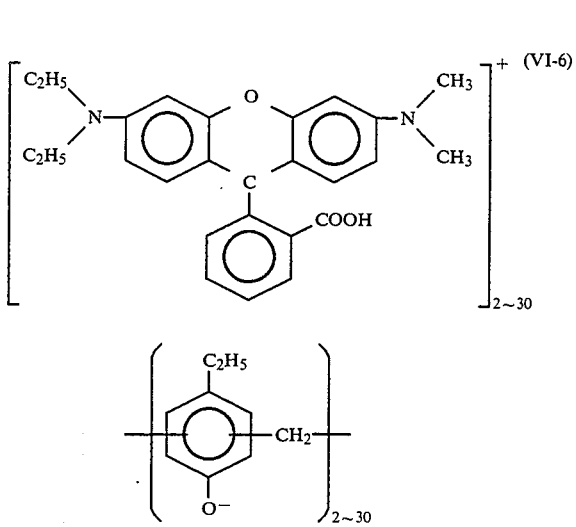

To 85 parts of unmodified ethanol were added 5 parts of a pink dye represented by the above-mentioned formula and 10 parts of an ethanol-soluble resin (trade name "TAMANOL 510"; made by Arakawa Chemical Industry Co., Ltd.), and the mixture was then stirred for 1 hour to obtain an ethanol-based pink ink for marking pens.

Example 17

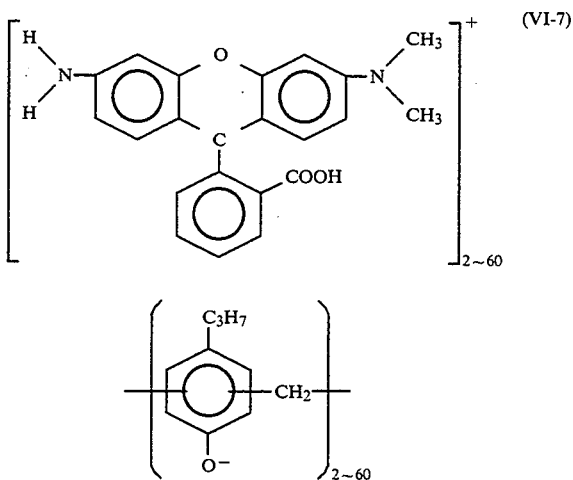

To 84 parts of unmodified ethanol were added 3 parts of a pink dye represented by the above-mentioned formula and 13 parts of an ethanol-soluble resin (trade name "HILACK 110H"; made by Hitachi Chemical Co., Ltd.), and the mixture was then stirred for 1 hour to obtain an ethanol-based pink ink for marking pens.

Example 18

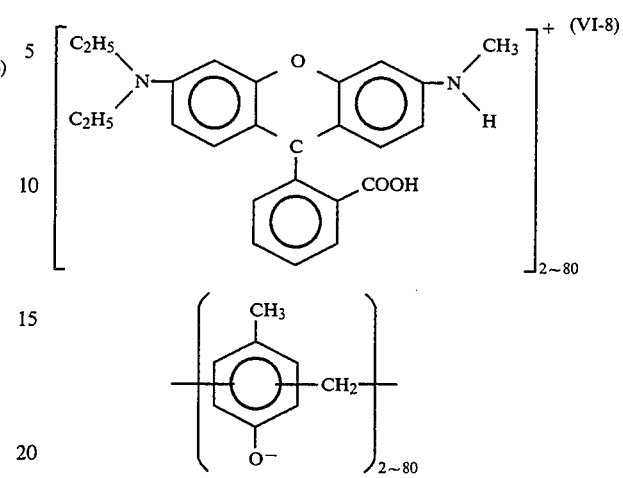

To a mixture of 83 parts of unmodified ethanol and 2 parts of isopropyl alcohol were added 5 parts of a pint dye represented by the above-mentioned formula and 10 parts of an ethanol-soluble resin (trade name "KETONERESIN K90"; made by Arakawa Chemical Industry Co., Ltd.), and the mixture was then stirred for 1 hour to obtain an ethanol-based pink ink for marking pens.

For the ethanol-based inks for marking pens obtained in Examples 1 to 18, tests were carried out, and the results are set forth in Table 1.

TABLE 1

| | Dye Formula | Color | Characteristics of Ink | | |
| --- | --- | --- | --- | --- | --- |
| | | | Stability | Stability with Time | Water Resistance |
| Example 1 | I-6 | Yellow | o | o | o |
| Example 2 | I-7 | Yellow | o | o | o |
| Example 3 | I-8 | Yellow | o | o | o |
| Example 4 | II-6 | Orange | o | o | o |
| Example 5 | II-7 | Orange | o | o | o |
| Example 6 | II-8 | Orange | o | o | o |
| Example 7 | III-2 | Red | o | o | o |
| Example 8 | III-3 | Red | o | o | o |
| Example 9 | III-4 | Red | o | o | o |
| Example 10 | IV-6 | Blue | o | o | o |
| Example 11 | IV-7 | Blue | o | o | o |
| Example 12 | IV-8 | Blue | o | o | o |
| Example 13 | V-6 | Blue | o | o | o |
| Example 14 | V-7 | Blue | o | o | o |
| Example 15 | V-8 | Blue | o | o | o |
| Example 16 | VI-6 | Pink | o | o | o |
| Example 17 | VI-7 | Pink | o | o | o |
| Example 18 | VI-8 | Pink | o | o | o |

Example 19

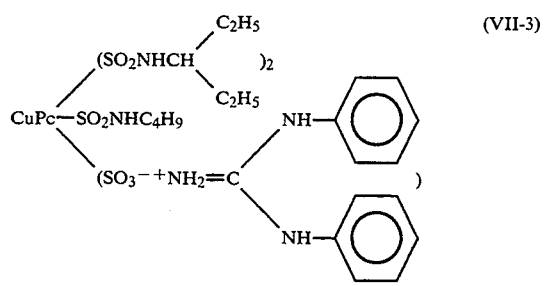

To 83 parts of unmodified ethanol were added 3 parts of a sky-blue dye represented by the above-mentioned formula and 14 parts of an ethanol-soluble resin (trade name "KETONERESIN K90"; made by Arakawa Chemical Industry Co., Ltd.), and the mixture was then stirred for 1 hour to obtain an ethanol-based sky-blue ink for marking pens.

Example 20

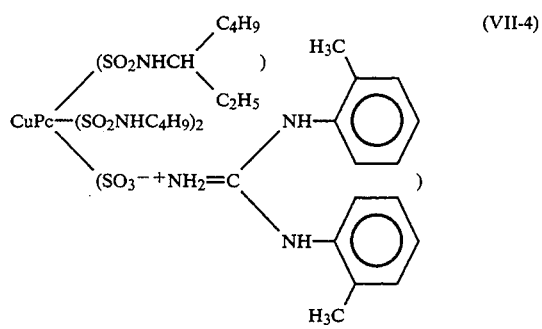
(VII-4)

To 87 parts of unmodified ethanol were added 3 parts of a sky-blue dye represented by the above-mentioned formula and 10 parts of an ethanol-soluble resin (trade name "TAMANOL PA"; made by Arakawa Chemical Industry Co., Ltd.), and the mixture was then stirred for 1 hour to obtain an ethanol-based sky-blue ink for marking pens.

Example 21

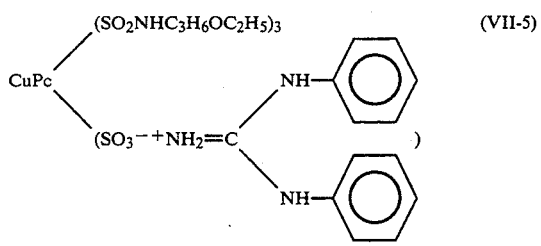
(VII-5)

To 87 parts of unmodified ethanol were added 3 parts of a sky-blue dye represented by the above-mentioned formula and 8 parts of an ethanol-soluble resin (trade name "HILACK 110H"; made by Hitachi Chemical Co., Ltd.), and the mixture was then stirred for 1 hour to obtain an ethanol-based sky-blue ink for marking pens.

Example 22

To 78 parts of unmodified ethanol were added 10 parts of a black dye represented by the above-mentioned formula (VIII-2) and 12 parts of an ethanol-soluble resin (trade name "HITANOL 1501"; made by Hitachi Chemical Co., Ltd.), and the mixture was then stirred for 1 hour to obtain an ethanol-based black ink for marking pens.

Example 23

To 78 parts of unmodified ethanol were added 12 parts of a black dye represented by the above-mentioned formula (VIII-1) and 10 parts of an ethanol-soluble resin (trade name "HITANOL 2501"; made by Hitachi Chemical Co., Ltd.), and the mixture was then stirred for 1 hour to obtain an ethanol-based black ink for marking pens.

Example 24

To a mixture of 3 parts of benzyl alcohol and 79 parts of unmodified ethanol were added 8 parts of a black dye represented by the above-mentioned formula (VIII-3) and 10 parts of an ethanol-soluble resin (trade name "KETONERESIN K90"; made by Arakawa Chemical Industry Co., Ltd.), and the mixture was then stirred for 1 hour to obtain an ethanol-based black ink for marking pens.

Example 25

To 80 parts of unmodified ethanol were added 10 parts of a black dye represented by the above-mentioned formula (IX-2) and 10 parts of an ethanol-soluble resin (trade name "HITANOL 2501"; made by Hitachi Chemical Co., Ltd.), and the mixture was then stirred for 1 hour to obtain an ethanol-based black ink for marking pens.

Example 26

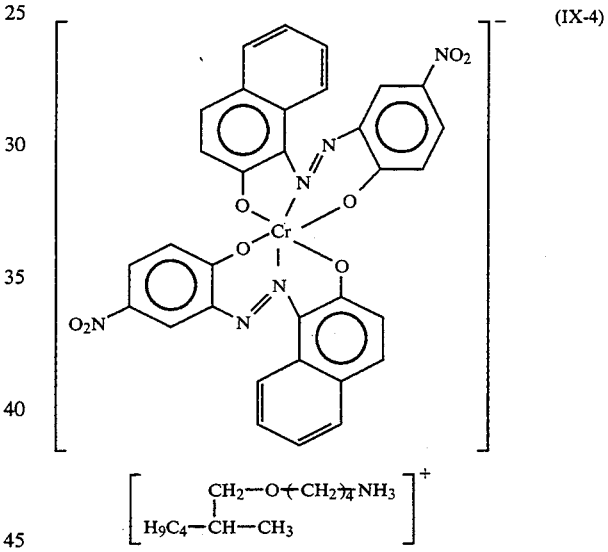
(IX-4)

To 76 parts of unmodified ethanol were added 12 parts of a black dye represented by the above-mentioned formula (IX-4) and 12 parts of an ethanol-soluble resin (trade name "HITANOL 2501"; made by Hitachi Chemical Co., Ltd.), and the mixture was then stirred for 1 hour to obtain an ethanol-based black ink for marking pens.

Example 27

To a mixture of 5 parts of benzyl alcohol and 75 parts of unmodified ethanol were added 8 parts of a black dye represented by the above-mentioned formula (IX-1) and 12 parts of an ethanol-soluble resin (trade name "KETONERESIN. K90"; made by Arakawa Chemical Industry Co., Ltd.), and the mixture was then stirred for 1 hour to obtain an ethanol-based black ink for marking pens.

For the ethanol-based inks for marking pens obtained in Examples 19 to 27, tests were carried out, and the results are set forth in Table 2.

TABLE 2

| Example | Dye Formula | Color | Stability | Stability with Time | Water Resistance |
|---|---|---|---|---|---|
| Example 19 | VII-3 | Sky blue | o | o | o |
| Example 20 | VII-4 | Sky blue | o | o | o |
| Example 21 | VII-5 | Sky blue | o | o | o |
| Example 22 | VIII-2 | Black | o | o | o |
| Example 23 | VIII-1 | Black | o | o | o |
| Example 24 | VIII-3 | Black | o | o | o |
| Example 25 | IX-2 | Black | o | o | o |
| Example 26 | IX-4 | Black | o | o | o |
| Example 27 | IX-1 | Black | o | o | o |

Example 28

To 78 parts of unmodified ethanol were added 10 parts of Color Index No. Solvent Black 7 and 12 parts of an ethanol-soluble resin (trade name "HITANOL 1501"; made by Hitachi Chemical Co., Ltd.), and the mixture was then stirred for 1 hour to obtain an ethanol-based black ink for marking pens.

Example 29

To 78 parts of unmodified ethanol were added 12 parts of Color Index No. Solvent Black 7 and 10 parts of an ethanol-soluble resin (trade name "HITANOL 2501"; made by Hitachi Chemical Co., Ltd.), and the mixture was then stirred for 1 hour to obtain an ethanol-based black ink for marking pens.

Example 30

To a mixture of 3 parts of benzyl alcohol and 79 parts of unmodified ethanol were added 8 parts of Color Index No. Solvent Black 7 and 10 parts of an ethanol-soluble resin (trade name "KETONERESIN K90"; made by Arakawa Chemical Industry Co., Ltd.), and the mixture was then stirred for 1 hour to obtain an ethanol-based black ink for marking pens.

In order to evaluate fixing properties of the ethanol-based black inks for marking pens obtained in Examples 28–30 to metal plates (brass), fixing tests were carried out, and the results are set forth in Table 3.

TABLE 3

| | Fixing Properties |
|---|---|
| Example 28 | o |
| Example 29 | o |
| Example 30 | o |

Possibility of Industrial Utilization

In an ethanol-based ink for marking pens of the present invention, components are excellent in compatibility with ethanol, and any precipitates are not present and so the ink is stable with time. Linear marks written by the marking pen using this ink are excellent in water resistance.

The present invention can provide inks for marking pens of yellow, orange, red, blue, pink, sky-blue, black and the like. Furthermore, in the present invention, ethanol is used as a solvent, and thus the ink is less odorous and less poisonous. Hence, the ink of the present invention is also good safety to human beings.

In addition, the ink of the present invention is excellent in fixing properties to a metal surface.

We claim:

1. An ethanol-based ink for marking pens comprising at least one dye selected from the group consisting of dyes represented by the following formulae (I) to (IX), an ethanol-soluble resin, and ethanol:

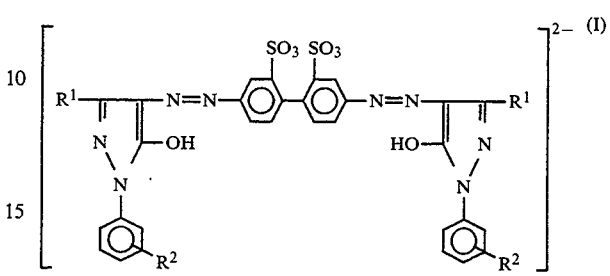

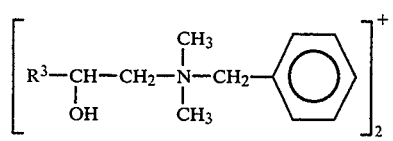

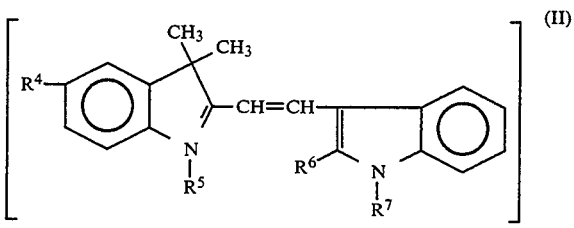

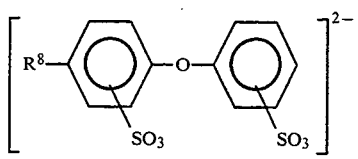

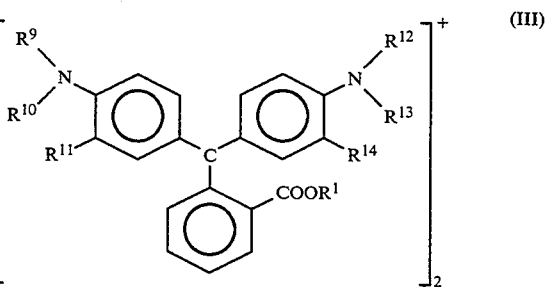

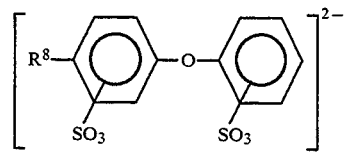

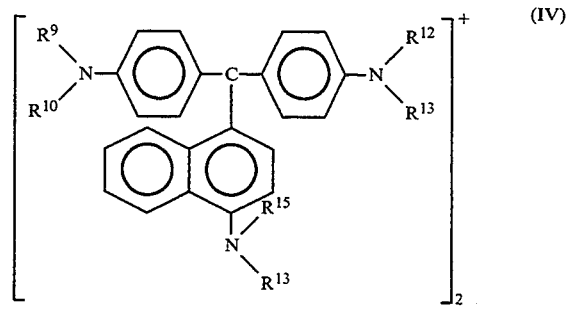

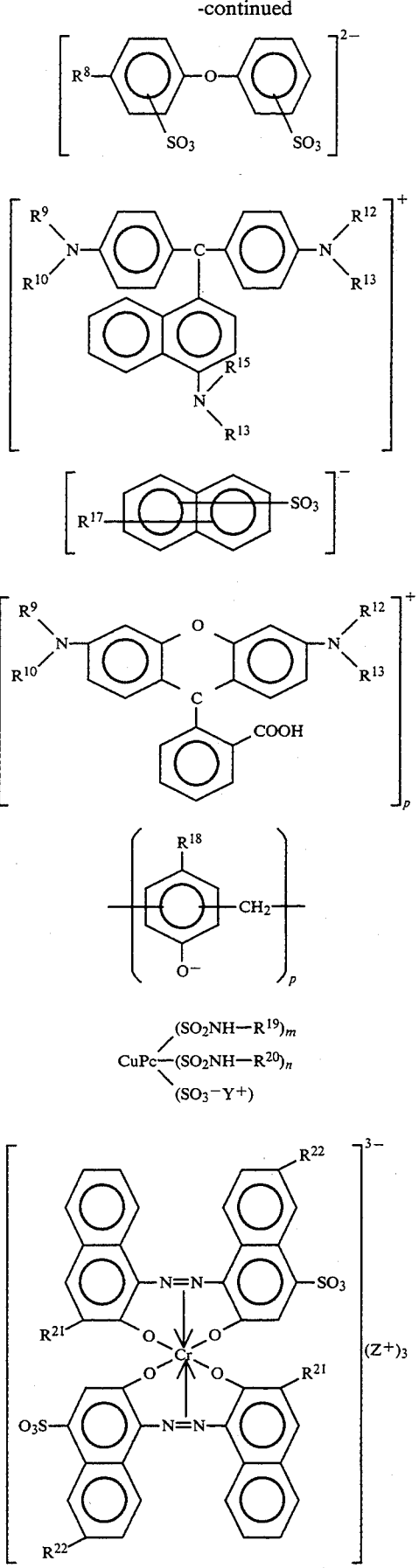

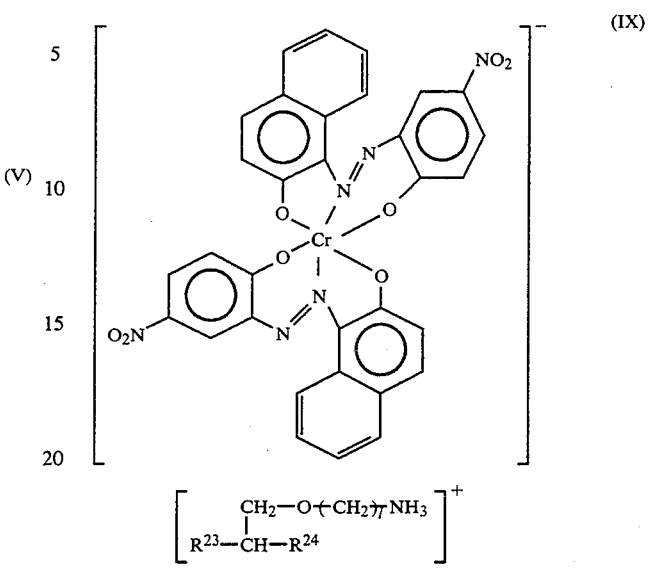

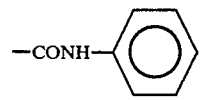

wherein $R^1$ is —$CH_3$ or —$C_2H_5$, $R^2$ is —H, —$CH_3$, —Cl or —$SO_2NH_2$, $R^3$ is an alkyl group of $C_6$-$C_{18}$, $R^4$ is —H, —$CH_3$, or —Cl, $R^5$ is —$CH_3$ or —$C_2H_5$, $R^6$ is —H, —$CH_3$, —$C_2H_5$, or a phenyl group, $R^7$ is —H, —$CH_3$ or —$C_2H_5$, $R^8$ is an alkyl group or a substituted alkyl group of $C_6$-$C_{18}$, each of $R^9$-$R^{14}$ is independently —H, —$CH_3$ or —$C_2H_5$, each of $R^{15}$ and $R^{16}$ is independently —H, —$CH_3$, —$C_2H_5$, or a phenyl group, $R^{17}$ is —H, —$CH_3$, —$C_2H_5$, OH, —$NH_2$ or —$NO_2$, $R^{18}$ is an alkyl group of $C_1$-$C_4$, p is a value in the range of 2 to 80, CuPc is a copper phthalocyanine group, each of $R^{19}$ and $R^{20}$ is independently an alkyl group or a substituted alkyl group, $Y^+$ is a substituted guanidine cation, each of m and n is an integer and m+n is in the range of 2 to 4, $R^{21}$ is H or a group represented by the formula $R^{22}$ is —H, —$NO_2$ or —$CH_3$, $Z^+$ is an ammonium ion containing at least one of an alkyl group, an alkoxy-substituted alkyl group and a hydroxy-substituted alkyl group of $C_{10}$-$C_{18}$, each of $R^{23}$ and $R^{24}$ is an alkyl group of $C_1$-$C_4$, and l is an integer of 1 to 5.

2. The ethanol-based ink for marking pens according to claim 1 which comprises 1 to 20% by weight of the dye, 1 to 15% by weight of the ethanol-soluble resin and 65 to 98% by weight of ethanol.

3. An ink for marking pens according to claim 1 which comprises a yellow dye represented by the formula (I)

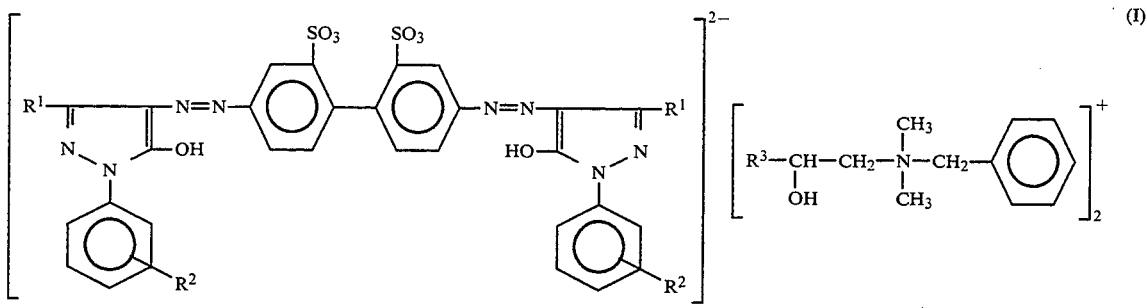

wherein $R^1$ is $-CH_3$ or $-C_2H_5$, $R^2$ is $-H$, $-CH_3$, $-Cl$ or $-SO_2NH_2$, and $R^3$ is an alkyl group of $C_6-C_{18}$, an ethanol-soluble resin, and ethanol.

4. An ink for marking pens according to claim 1, which comprises an orange dye represented by the formula (II)

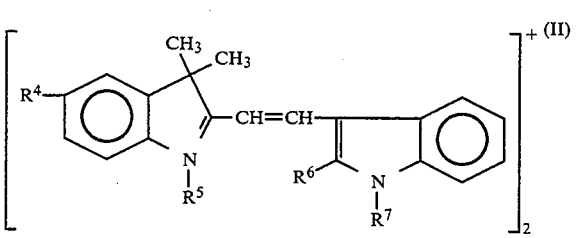

wherein $R^4$ is $-H$, $-CH_3$ or $-Cl$, $R^5$ is $-CH_3$ or $-C_2H_5$, $R^6$ is $-H$, $-CH_3$, $-C_2H_5$ or a phenyl group, $R^7$ is $-H$, $-CH_3$ or $-C_2H_5$ or a phenyl group, $R^7$ is $-H$, $-CH_3$ or $-C_2H_5$, and $R^8$ is an alkyl group or a substituted alkyl group of $C_6-C_{18}$, an ethanol-soluble resin, and ethanol.

5. An ink for marking pens according to claim 1, which comprises a red dye represented by the formula (III)

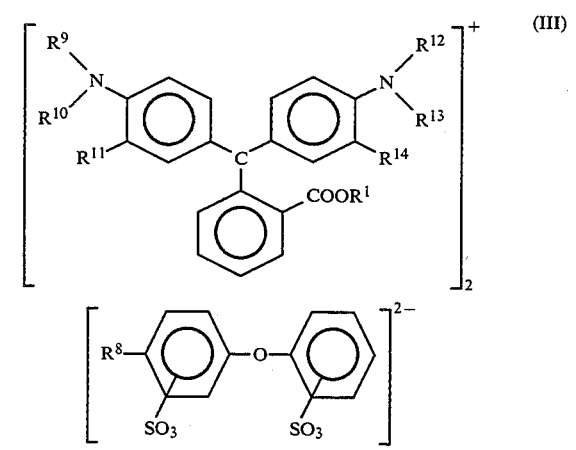

wherein each of $R^9$ through $R^{14}$ is independently $-H$, $-CH_3$ or $-C_2H_5$, $R^1$ is $-CH_3$ or $-C_2H_5$, and $R^8$ is an alkyl group or a substituted alkyl group of $C_6-C_{18}$, an ethanol-soluble resin, and ethanol.

6. An ink for marking pens according to claim 1, which comprises a blue dye represented by the formula (IV)

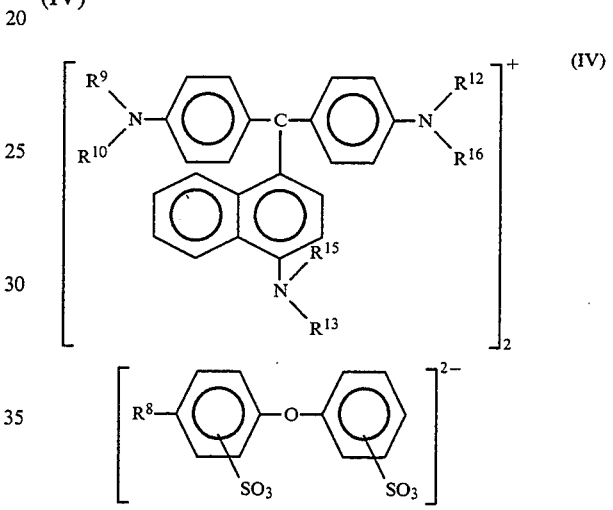

wherein each of $R^9$, $R^{10}$, $R^{12}$ and $R^{13}$ is independently $-H$, $-CH_3$ or $-C_2H_5$, each of $R^{15}$ and $R^{16}$ is independently $-H$, $-CH_3$, $-C_2H_5$ or a phenyl group, and $R^8$ is an alkyl group or a substituted alkyl group of $C_6-C_{18}$, an ethanol-soluble resin, and ethanol.

7. An ink for marking pens according to claim 1 which comprises a blue dye represented by the formula (V)

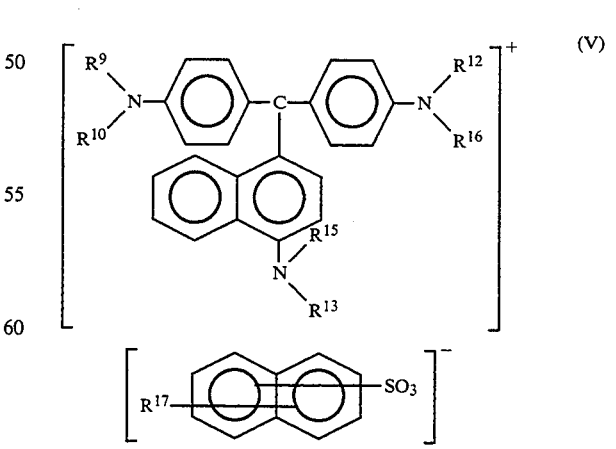

wherein each of $R^9$, $R^{10}$, $R^{12}$ and $R^{13}$ is independently $-H$, $-CH_3$ or $-C_2H_5$, each of $R^{15}$ and $R^{16}$ is independently $-H$, $-CH_3$, $-C_2H_5$, or a phenyl group, and $R^{17}$ is —H, —CH$_3$, —C$_2$H$_5$, —OH, —NH$_2$ or —NO$_2$, an ethanol-soluble resin, and ethanol.

8. An ink for marking pens according to claim 1, which comprises a pink dye represented by the formula (VI)

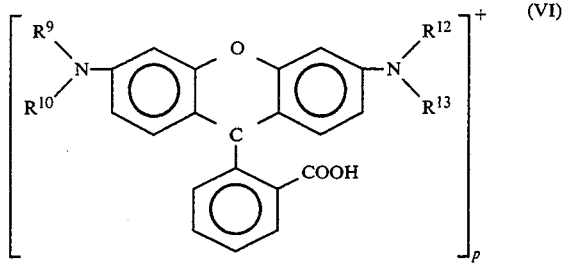

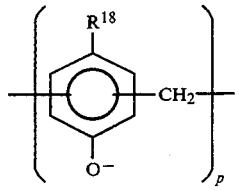

wherein each of $R^9$, $R^{10}$, $R^{12}$ and $R^{13}$ is independently —H, —CH$_3$ or —C$_2$H$_5$, $R^{18}$ is an alkyl group of C$_1$–C$_4$, and p is a value in the range of 2 to 80, an ethanol-soluble resin, and ethanol.

9. An ink for marking pens according to claim 1, which comprises a sky-blue dye represented by the formula (VII)

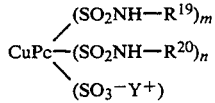

wherein CuPc is a copper phthalocyanine group, each of $R^{19}$ and $R^{20}$ is independently an alkyl group or a substituted alkyl group, Y$^+$ is a substituted guanidine cation, each of m and n is an integer and m+n is in the range of 2 to 4, an ethanol-soluble resin, and ethanol.

10. An ink for marking pens according to claim 1, which comprises a black dye represented by the formula (VIII)

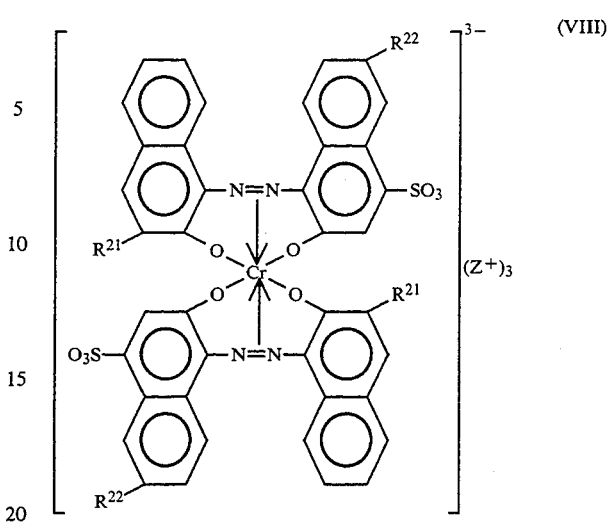

wherein $R^{21}$ is H or a group represented by the formula

—CONH—⟨phenyl⟩

$R^{22}$ is —H, —NO$_2$ or —CH$_3$, and Z$^+$ is an ammonium ion containing at least one of an alkyl group, an alkoxy-substituted alkyl group and a hydroxy-substituted alkyl group of C$_{10}$–C$_{18}$, an ethanol-soluble resin, and ethanol.

11. An ink for marking pens according to claim 1, which comprises a black dye represented by the formula (IX)

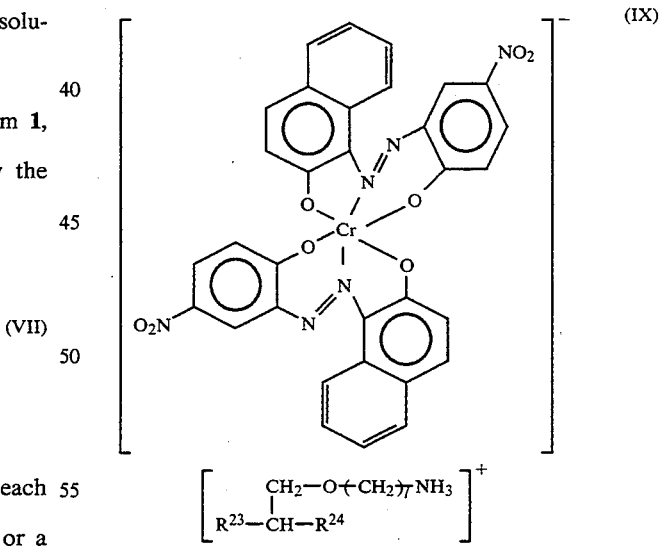

wherein each of $R^{23}$ and $R^{24}$ is an alkyl group of C$_1$–C$_4$, and l is an integer of 1 to 5, an ethanol-soluble resin, and ethanol.

12. An ethanol-based ink for marking pens consisting of a dye of Color Index No. Solvent Black 7, an ethanol-soluble resin, ethanol and a fatty acid.

13. The ethanol-based ink for marking pens according to claim 12 consisting of 1 to 15% by weight of a dye of Color Index No. Solvent Black 7, 1 to 15% by weight of an ethanol-soluble resin, 1–5% by weight of fatty acid, and 65 to 98% by weight of ethanol.

* * * * *

UNITED STATES PATENT AND TRADEMARK OFFICE
CERTIFICATE OF CORRECTION

PATENT NO. : 5,423,907
DATED : June 13, 1995
INVENTOR(S) : Morikubo et al

It is certified that error appears in the above-identified patent and that said Letters Patent is hereby corrected as shown below:

In the cover page of the patent, Section [73], please delete "Kaibha" and substitute therefor --Kaisha--.

In the cover page of the patent, Section [86], please delete "PCT/JP93/00019" and substitute therefor --PCT/JP93/00819--

Signed and Sealed this

Twenty-second Day of August, 1995

Attest:

BRUCE LEHMAN

Attesting Officer

Commissioner of Patents and Trademarks